(12) United States Patent
Kaneichi

(10) Patent No.: US 11,557,203 B2
(45) Date of Patent: Jan. 17, 2023

(54) INFORMATION PROCESSING DEVICE, NON-TRANSITORY STORAGE MEDIUM, AND EVALUATION METHOD

(71) Applicant: TOYOTA JIDOSHA KABUSHIKI KAISHA, Toyota (JP)

(72) Inventor: Daiki Kaneichi, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 17/164,899

(22) Filed: Feb. 2, 2021

(65) Prior Publication Data

US 2021/0304599 A1    Sep. 30, 2021

(30) Foreign Application Priority Data

Mar. 26, 2020  (JP) .............................. JP2020-056512

(51) Int. Cl.
*H04W 4/48*       (2018.01)
*G08G 1/0967*     (2006.01)
*H04W 4/14*       (2009.01)

(52) U.S. Cl.
CPC . *G08G 1/096716* (2013.01); *G08G 1/096758* (2013.01); *H04W 4/14* (2013.01); *H04W 4/48* (2018.02)

(58) Field of Classification Search
CPC ......................... H04W 76/14; G08G 1/096716
See application file for complete search history.

(56) References Cited

U.S. PATENT DOCUMENTS

| | | | |
|---|---|---|---|
| 8,504,083 B1* | 8/2013 | Gill .......................... | H04W 4/14 455/452.2 |
| 9,433,024 B2* | 8/2016 | Lee .......................... | H04W 76/14 |
| 10,820,148 B2* | 10/2020 | Pao .......................... | H04W 4/021 |
| 2014/0323167 A1* | 10/2014 | Spearritt .................. | H04W 4/14 455/466 |
| 2015/0035666 A1* | 2/2015 | Scofield ................. | G06Q 50/30 340/439 |
| 2016/0150070 A1* | 5/2016 | Goren .................. | G08G 1/0112 455/418 |
| 2018/0033112 A1* | 2/2018 | Wu ..................... | G06Q 30/0639 |
| 2020/0265542 A1* | 8/2020 | Matsushima ...... | G01C 21/3438 |
| 2021/0304599 A1* | 9/2021 | Kaneichi ................. | H04W 4/14 |

FOREIGN PATENT DOCUMENTS

JP       2002-342426 A       11/2002

* cited by examiner

*Primary Examiner* — Qutbuddin Ghulamali
(74) *Attorney, Agent, or Firm* — Oblon, McClelland, Maier & Neustadt, L.L.P.

(57) ABSTRACT

An information processing device includes a communication unit and a control unit. The control unit selects at least one instant message as a selected message from one or more instant messages transmitted and received between terminal devices including a first terminal device. The control unit selects the selected message based on at least one of pick-up time and drop-off time of a vehicle picking up and dropping off a first user of the first terminal device. The control unit determines evaluation of a service provided in the vehicle based on the selected message.

19 Claims, 11 Drawing Sheets

FIG. 5

|  |  | SELECTED MESSAGE | PHRASE | EVALUATION |
|---|---|---|---|---|
| VEHICLE 20A | DRIVER | "BY THE WAY, THIS DRIVER IS VERY BAD AT DRIVING!" | VERY BAD | LOW EVALUATION |
|  | CABIN ENVIRONMENT | "MY TAXI HAS A NEAT INTERIOR, TOO!" | NEAT | HIGH EVALUATION |
| VEHICLE 20B | DRIVER | "MY DRIVER IS GOOD AT DRIVING" | GOOD | HIGH EVALUATION |
|  | CABIN ENVIRONMENT | "IN ADDITION, THE INTERIOR OF THE TAXI IS VERY NEAT" | NEAT | HIGH EVALUATION |

FIG. 6

|  |  | SELECTED MESSAGE | FEELING CATEGORY | EVALUATION (SCORE) |
|---|---|---|---|---|
| VEHICLE 20A | DRIVER | "BY THE WAY, THIS DRIVER IS VERY BAD AT DRIVING!" | DISLIKE | -2 |
|  | CABIN ENVIRONMENT | "MY TAXI HAS A NEAT INTERIOR, TOO!" | SATISFIED | 1 |
| VEHICLE 20B | DRIVER | "MY DRIVER IS GOOD AT DRIVING" | SATISFIED | 1 |
|  | CABIN ENVIRONMENT | "IN ADDITION, THE INTERIOR OF THE TAXI IS VERY NEAT" | VERY SATISFIED | 2 |

INFORMATION PROCESSING DEVICE, NON-TRANSITORY STORAGE MEDIUM, AND EVALUATION METHOD

CROSS-REFERENCE TO RELATED APPLICATION

This application claims priority to Japanese Patent Application No. 2020-056512 filed on Mar. 26, 2020, incorporated herein by reference in its entirety.

BACKGROUND

1. Technical Field

The present disclosure relates to an information processing device, a non-transitory storage medium, and an evaluation method.

2. Description of Related Art

There is conventionally known a technique of allocating a vehicle in response to a user's request (for example, Japanese Patent Application Publication No. 2002-342426 (JP 2002-342426 A)). Disclosed in JP 2002-342426 A is a technique in which a vehicle allocation center transmits vehicle allocation command information to a vehicle based on vehicle allocation request information acquired from a portable device.

SUMMARY

It is demanded to evaluate a service provided in a vehicle.

An object of the present disclosure is to provide an information processing device, a non-transitory storage medium, and an evaluation method capable of evaluating a service provided in a vehicle.

The information processing device according to the present disclosure includes: a communication unit; and a control unit. The control unit is configured to select at least one instant message as a selected message from one or more instant messages transmitted and received between a plurality of terminal devices including a first terminal device, based on at least one of pick-up time and drop-off time of a vehicle picking up and dropping off a first user of the first terminal device, and determine evaluation of a service provided in the vehicle based on the selected message.

A non-transitory storage medium according to the present disclosure stores instructions that are executable by one or more processors and that cause the one or more processors to perform functions. The functions includes: selecting at least one instant message as a selected message from one or more instant messages transmitted and received between a plurality of terminal devices including a first terminal device, based on at least one of pick-up time and drop-off time of a vehicle picking up and dropping off a first user of the first terminal device; and determining evaluation of a service provided in the vehicle based on the selected message.

An evaluation method according to the present disclosure includes: transmitting and receiving one or more instant messages between a plurality of terminal devices including a first terminal device; selecting with an information processing device at least one instant message from one or more instant messages transmitted and received between the terminal devices as a selected message, based on at least one of pick-up time and drop-off time of a vehicle picking up and dropping off a first user of the first terminal device; and determining by the information processing device evaluation of a service provided in the vehicle based on the selected message.

The present disclosure can provide the information processing device, the non-transitory storage medium, and the evaluation method capable of evaluating a service provided in a vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 shows a first example of an evaluation result according to the first embodiment of the present disclosure;

FIG. 6 shows a second example of the evaluation result according to the first embodiment of the present disclosure;

DETAILED DESCRIPTION OF EMBODIMENTS

Figure 1:
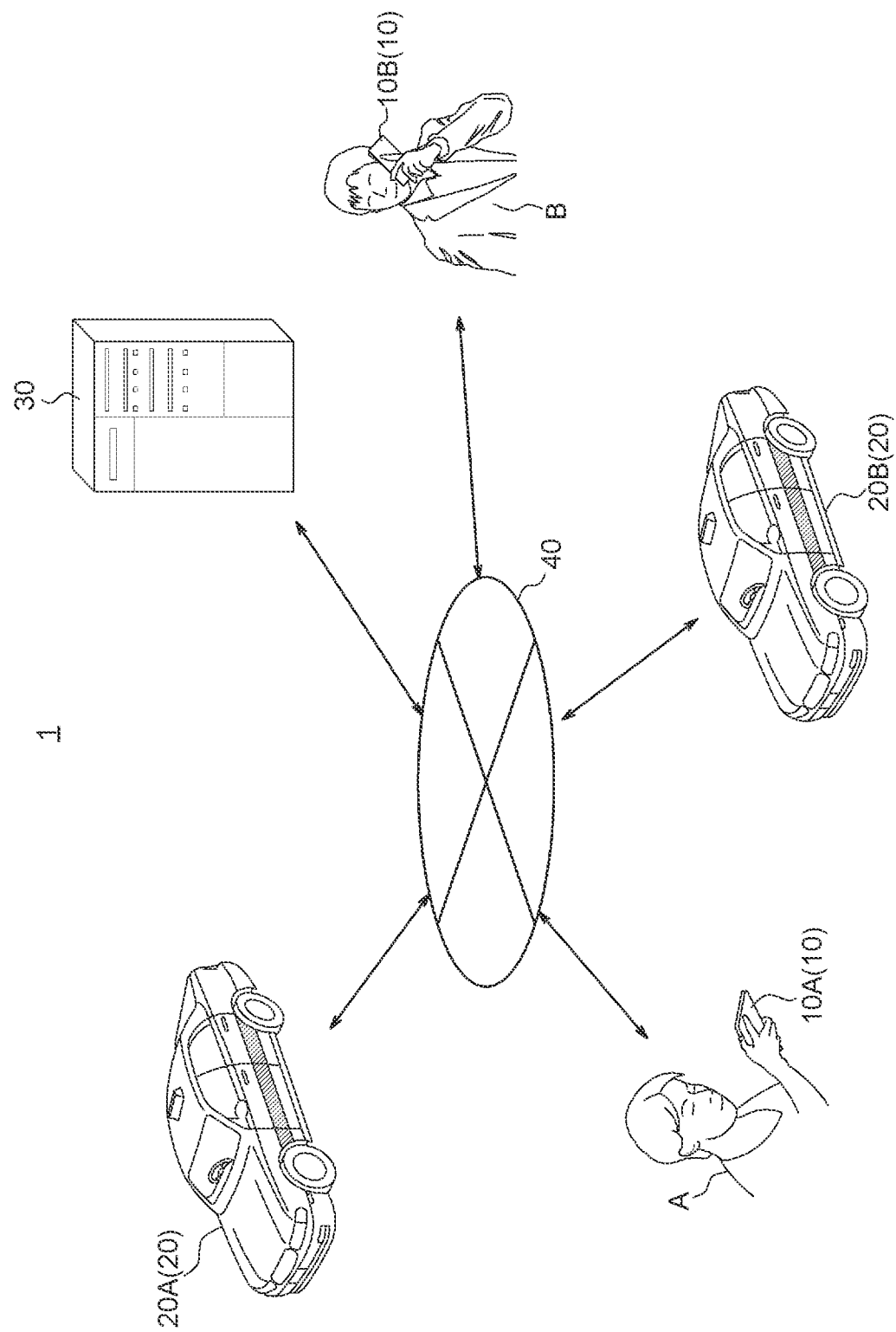
FIG. 1 shows configuration of an information processing system according to a first embodiment of the present disclosure.

Embodiments of the present disclosure will be described hereinbelow with reference to the drawings. As for the component members in the following drawings, like component members are denoted by like reference numerals.

First Embodiment

As shown in FIG. 1, an information processing system 1 according to a first embodiment of the present disclosure includes a terminal device 10A, a terminal device 10B, a vehicle 20A, a vehicle 20B, and an information processing device 30.

Hereinafter, the terminal device 10A and the terminal device 10B are also collectively stated as "terminal devices 10" unless otherwise distinguished from each other. FIG. 1 shows the information processing system 1 including two terminal devices 10. The number of the terminal devices 10 included in the information processing system 1 is not limited to two. The information processing system 1 may include two or more terminal devices 10. For example, the number of the terminal devices 10 included in the information processing system 1 may be three or more.

Hereinafter, the vehicle 20A and the vehicle 20B are also collectively stated as "vehicles 20" unless otherwise distinguished from each other. FIG. 1 shows the information processing system 1 including two vehicles 20. The number of the vehicles 20 included in the information processing system 1 is not limited to two. The information processing system 1 may include at least one vehicle 20. For example, the number of the vehicles 20 included in the information processing system 1 may be one, or may be three or more.

The terminal devices 10, the vehicles 20, and the information processing device 30 can communicate with each other through a network 40. The network 40 may be any network including mobile communications networks, and the Internet.

The terminal devices 10 can be used by users. Different terminal devices 10 can be used by different users. For example, the terminal device 10A is used by a user A. The terminal device 10B is used by a user B.

Figure 3:
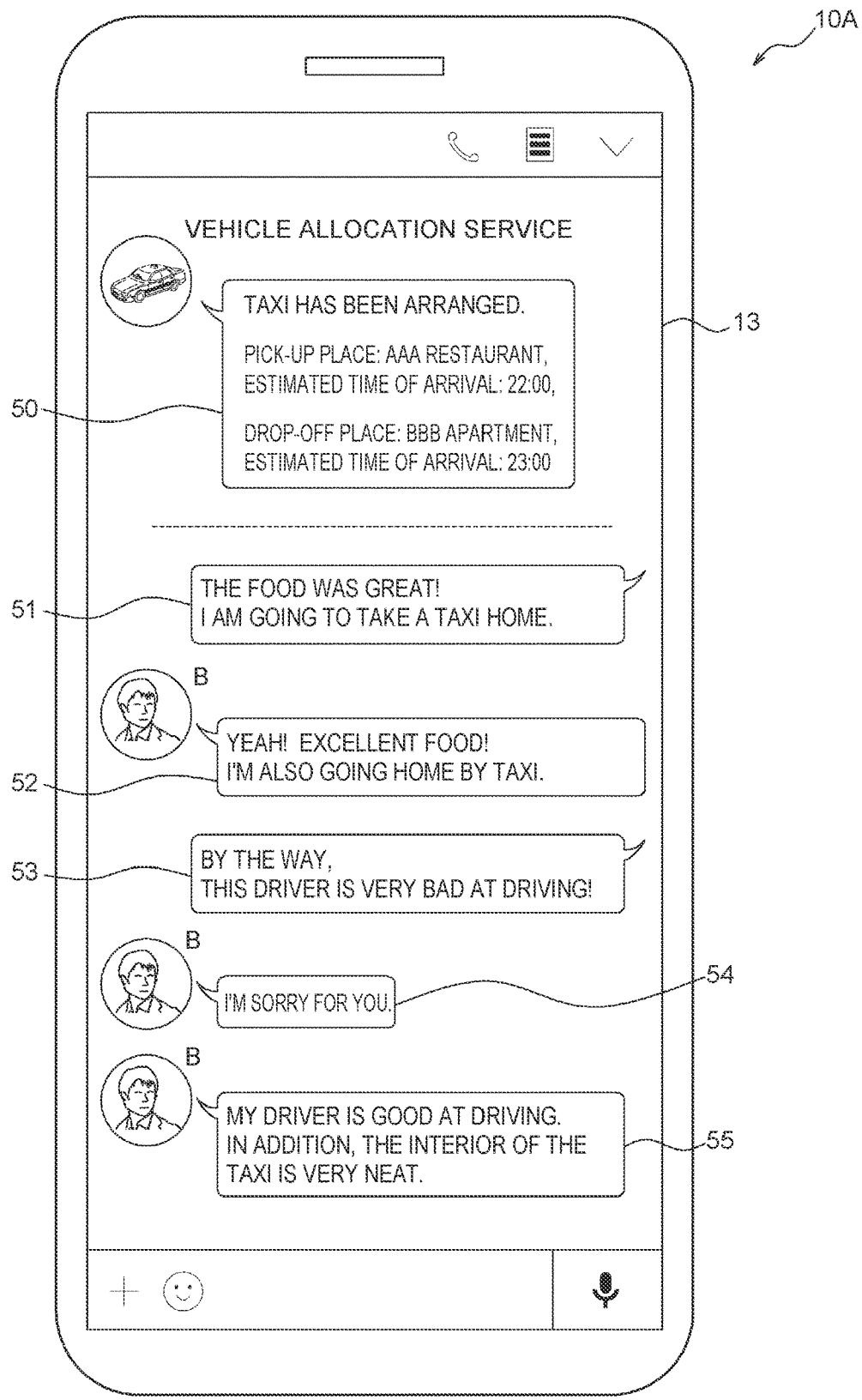
FIG. 3 shows an example of the screen of a terminal device shown in FIG. 1.
Figure 4:
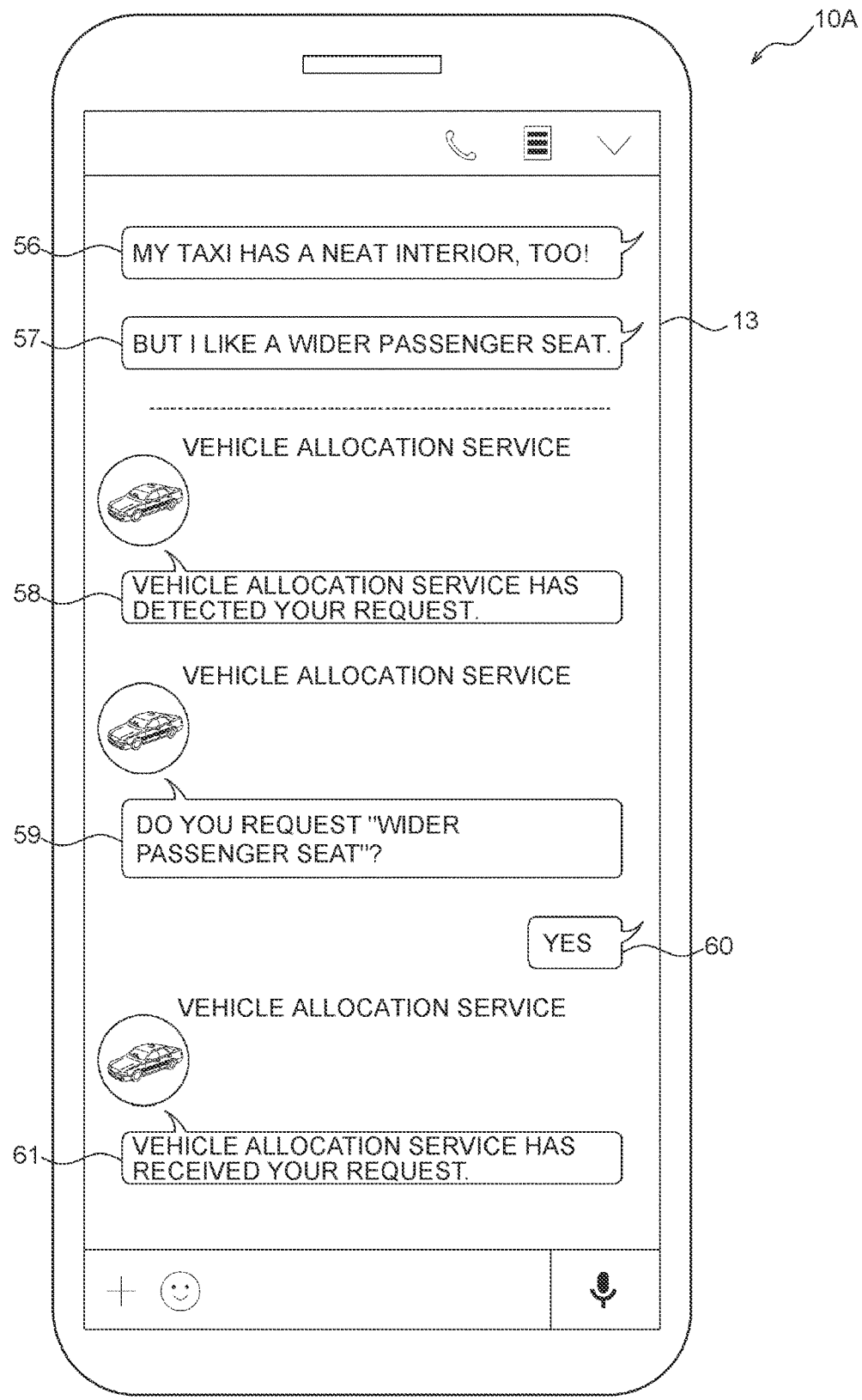
FIG. 4 shows an example of the screen of the terminal device shown in FIG. 1.

The terminal devices 10 can transmit and receive instant messages described later as shown in FIGS. 3 and 4 between each other through the network 40. The terminal devices 10 may have a social networking service (SNS) application, such as an instant messenger, installed therein. In the present embodiment, the terminal devices 10 can function as SNS clients which execute the SNS application to use the SNS.

The terminal devices 10 may have a dedicated application, which provides a vehicle allocation service, installed therein. Hereinafter, the dedicated application which provides the vehicle allocation service is also stated as "vehicle allocation application". The vehicle allocation service is a service which allocates vehicles or the like to the places specified by users. For example, the user A and the user B can use the vehicle allocation service by properly using the vehicle allocation application in the terminal device 10A and the terminal device 10B.

The terminal devices 10 may be any devices as long as the SNS application or the like can be used. For example, the terminal devices 10 may be portable telephones, smartphones, tablets, or personal computers (PC).

The vehicles 20 can be allocated in a vehicle allocation service. For example, the vehicle 20A is allocated to a place specified by the user A. The vehicle 20B is allocated to a place specified by the user B. In the vehicle allocation service, the vehicles 20 can be employed as taxis or buses on demand.

The vehicles 20 may be any types of vehicles. Examples of the vehicles 20 are gasoline vehicles, diesel vehicles, hybrid vehicles (HVs), plug-in hybrid vehicles (PHVs), electric vehicles (EVs), or fuel cell vehicles (FCVs). The vehicles 20 may be driven by drivers. Driving of the vehicles 20 may be automated in any levels. For example, the level of automation is any one of level 1 to level 5 defined by Society of Automotive Engineers (SAE). The vehicles 20 may be vehicles dedicated for Mobility as a Service (MaaS).

The information processing device 30 can provide the vehicle allocation service. The information processing device 30 can be used as a vehicle allocation server which provides the vehicle allocation service. The information processing device 30 can provide the SNS, such as an instant messaging service, to the terminal devices 10. The information processing device 30 can be used as an SNS server which provides the SNS.

The information processing device 30 determines evaluation of the service provided in the vehicles 20 based on one or more instant messages transmitted and received between the terminal devices 10. Hereinafter, the service provided in the vehicles 20 is also stated as "in-vehicle service". The process will be described later in detail.

The information processing device 30 may be a dedicated computer configured to function as a server, a general-purpose personal computer, a cloud computing system, or the like.

Figure 2:
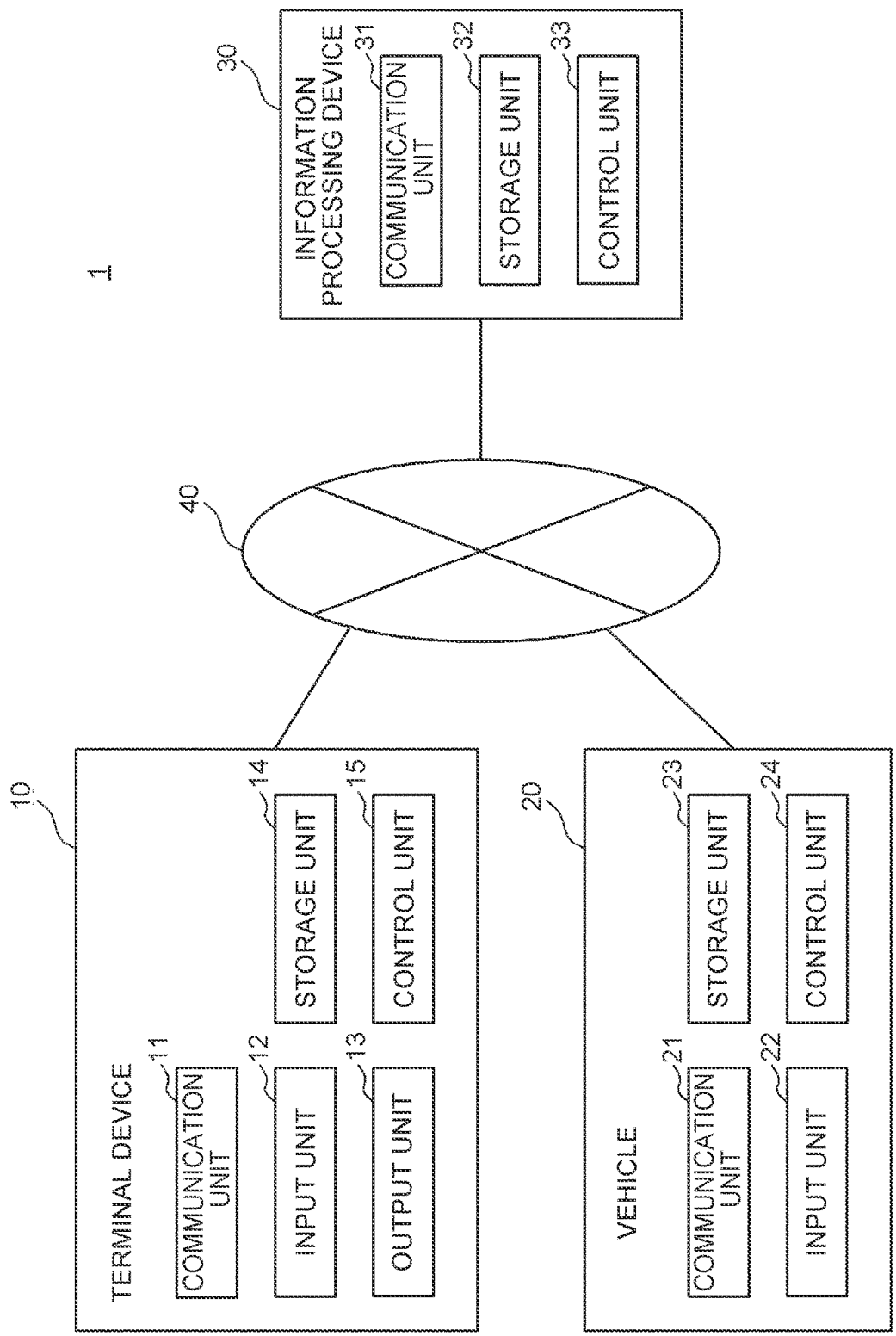
FIG. 2 is a block diagram showing detailed configuration of the information processing system according to FIG. 1.

As shown in FIG. 2, the terminal device 10 includes a communication unit 11, an input unit 12, an output unit 13, a storage unit 14, and a control unit 15.

The communication unit 11 may be configured by including at least one communication module connectable with the network 40. For example, the communication module is a module that conforms to communication standards, such as long term evolution (LTE), 4th generation (4G), or 5th generation (5G) communication standards. The communication unit 11 may be configured by further including a module that conforms to short-distance radio communications, such as Bluetooth (registered trademark). The communication unit 11 may be configured by further including a wireless communication module that conforms to non-contact telecommunications standards. The non-contact telecommunications standards may be near field communication (NFC) standards.

The input unit 12 can receive an input from a user. The input unit 12 may be configured by including at least one input interface which can receive an input from a user. The input interface may be a physical key, an electrostatic capacitance key, a pointing device, a touchscreen integrally provided with a display, a microphone, or the like. The input unit 12 may be provided in the terminal device 10, or may be connected to the terminal device 10 as external input equipment. When the input unit 12 is connected to the terminal device 10 as external input equipment, the input unit 12 and the terminal device 10 may be connected in any connection mode. Examples of the connection mode include universal serial bus (USB), high-definition multimedia interface (HDMI) (registered trademark), or Bluetooth (registered trademark).

The output unit 13 can output data. The output unit 13 may be configured by including at least one output interface which can output data. The output interface may be a display, a speaker, or the like. The display may be a liquid crystal display (LCD), an organic electro luminescence (EL) display, or the like. The output unit 13 may be provided in the terminal device 10, or may be connected to the terminal device 10 as external output equipment. When the output unit 13 is connected to the terminal device 10 as the external output equipment, the output unit 13 and the terminal device 10 may be connected in any connection mode. Examples of the connection mode include USB, HDMI (registered trademark), or Bluetooth (registered trademark).

The storage unit 14 may be configured by including at least one semiconductor memory, at least one magnetic memory, and at least one optical memory, or at least a combination of two types of these memories. For example, the semiconductor memory is a random access memory (RAM), or a read only memory (ROM). For example, the RAM is a static random access memory (SRAM) or a dynamic random access memory (DRAM). For example, the ROM is an electrically erasable programmable read only memory (EEPROM). The storage unit 14 may function as a main storage, an auxiliary storage, or a cache memory. The storage unit 14 stores data used for operation of the terminal device 10, and data obtained by operation of the terminal device 10.

The control unit 15 may be configured by including at least one processor and at least one specialized circuit, or a combination of these. The processor is a general-purpose processor, such as a central processing unit (CPU) or a graphics processing unit (GPU), or an exclusive processor specialized in specific processing. The specialized circuit is, for example, a field-programmable gate array (FPGA), or an application specific integrated circuit (ASIC). The control unit 15 can execute the processes related to the operation of the terminal device 10, while controlling each unit of the terminal device 10.

The function of the terminal device 10 may be implemented by executing a terminal control program according to the present embodiment by a processor corresponding to the control unit 15. In other words, the function of the terminal device 10 can be implemented by software. The terminal control program can cause a computer to function as the terminal device 10 by causing the computer to execute operation of the terminal device 10. In other words, the computer can function as the terminal device 10 by executing the operation of the terminal device 10 in accordance with the terminal control program.

In the present disclosure, the "program" can be recorded in a computer readable non-transitory recording medium. For example, the computer readable non-transitory recording medium is a magnetic recording medium, an optical disc, an optical magnetic recording medium, or a ROM. For example, the program can be distributed by selling, transferring or lending a portable recording medium, such as a digital versatile disc (DVD), or a compact disc read only memory (CD-ROM), having the program recorded therein. The program may be stored in a storage of the server. The program stored in the storage of the server may be distributed by being transferred to other computers. The program may be provided as a program product.

In the present disclosure, the "computer" can temporarily store the program, which is recorded in a portable recording medium or transferred from the server, in the main storage, for example. The computer can further read the program stored in the main storage by a processor, and can execute the process in accordance with the read program by the processor. The computer may read the program directly from the portable recording medium, and may execute the process in accordance with the program. Whenever the program is transferred to the computer from the server, the computer may sequentially execute the process in accordance with the received program. The computer may execute the process by using the service of what is called an application service provider (ASP) which implements the functions through only execution instructions and result acquisition, without transfer of the program from the server to the computer. The program may include those equivalent to the program, which are information used for the process by an electronic calculator. For example, the data which does not constitute direct instructions to the computer though having the property of defining the processes of the computer corresponds to "those equivalent to the program".

Some or all of the functions of the terminal device 10 may be implemented by a specialized circuit corresponding to the control unit 15. In short, some or all of the functions of the terminal device 10 may be implemented by hardware.

Vehicle Allocation Request Process

The control unit 15 can receive an input to instruct startup of the vehicle allocation application by the input unit 12. The input to instruct the startup of the vehicle allocation application may be input through the input unit 12 by a user who wants to use the vehicle allocation service. When receiving the input to instruct the startup of the vehicle allocation application, the control unit 15 starts up the vehicle allocation application. When the vehicle allocation application is in operation, the user can input a vehicle allocation instruction, a pick-up place, and a drop-off place through the input unit 12. When receiving the input of the vehicle allocation instruction, the pick-up place, and the drop-off place through the input unit 12, the control unit 15 executes a vehicle allocation request process. In the vehicle allocation request process, the control unit 15 transmits a vehicle allocation request notification, location information on the pick-up place, and the location information on the drop-off place to the information processing device 30 with the communication unit 11 through the network 40.

After transmitting the vehicle allocation request notification and other information, the control unit 15 can receive an instant message with the communication unit 11 from the information processing device 30 through the network 40. The instant message may include a text indicating completion of vehicle allocation, the pick-up place, the drop-off place, estimated time of arrival at the pick-up place, estimated time of arrival at the drop-off place. The instant message is transmitted to the terminal device 10 from the information processing device 30 as a vehicle allocation server. The control unit 15 executes a later-described IM output process for the received instant message. When the control unit 15 executes the later-described IM output process, a later-described IM 50 as shown in FIG. 3 is output from the output unit 13.

Message Transmission Process

The control unit 15 can receive an input of text and an input of address information with the input unit 12 while, for example, the SNS application is in operation. The input of text and the input of address information may be input with the input unit 12 by the user who wants to transmit a prescribed text as an instant message to a prescribed counterpart. When receiving the input of the text and the input of the address information with the input unit 12, the control unit 15 executes an instant message generation process. Hereinafter, the instant message generation process is also stated as "IM generation process." In the IM generation process, the control unit 15 generates an instant message including a text input from the input unit 12. The control unit 15 transmits the generated instant message and the input address information to the information processing device 30 with the communication unit 11 through the network 40. In the IM generation process, the control unit 15 uses the output unit 13 to output the text which is input through the input unit 12.

Message Reception Process

The control unit 15 can receive instant messages from the information processing device 30 with the communication unit 11 through the network 40. The instant messages may include those transmitted to the terminal device 10 from other terminal devices 10 via the information processing device 30 serving as an SNS server, and those directly transmitted to the terminal device 10 from the information processing device 30 serving as a vehicle allocation server. The control unit 15 executes an instant message output process for the received instant messages. Hereinafter, the instant message output process is also stated as "IM output process". In the IM output process, when a text is included in the received instant message, the control unit 15 makes the output unit 13 to output the text. In the IM output process, when an image is included in the received instant message, the control unit 15 makes the output unit 13 output the image. In the SNS application, an image used as an instant message is also referred to as "stamp".

When the control unit 15 executes the IM generation process and the IM output process, instant messages as shown in FIGS. 3 and 4 are output from the output unit 13.

FIGS. 3 and 4 show examples of the screen of the terminal device 10A shown in FIG. 1. In FIGS. 3 and 4, the output unit 13 is a display. The output unit 13 which is a display outputs texts included in the instant messages by displaying the texts on the display. In the configuration shown in FIGS. 3 and 4, newly transmitted and received instant messages can sequentially be displayed on a lower side of the screen of the output unit 13 which is the display. The instant messages shown in FIG. 4 are transmitted and received after the instant messages shown in FIG. 3.

In FIGS. 3 and 4, the instant messages transmitted and received between the terminal device 10A and the terminal device 10B are shown. IMs 51 52, 53, 54, 55 as shown in FIG. 3 and IMs 56, 57 as shown in FIG. 4 are instant messages transmitted and received between the terminal device 10A and the terminal device 10B. After the user A and the user B dine together in a restaurant AAA, the IM 51 to IM 57 are transmitted and received between the terminal device 10A and the terminal device 10B. After dining together in the restaurant AAA, the user A and the user B ride in the vehicle 20A and the vehicle 20B, respectively. When the user A operates the terminal device 10A while riding in the vehicle 20A, instant messages can be transmitted from the terminal device 10A to the terminal device 10B. When the user B operates the terminal device 10B while riding in the vehicle 20B, instant messages can be transmitted from the terminal device 10B to the terminal device 10A.

As shown in FIG. 3, the IM 51 is transmitted from the terminal device 10A to the terminal device 10B. The IM 51 includes a text "The food was great! I am going to take a taxi home". The IM 52 is transmitted from the terminal device 10B to the terminal device 10A. The IM 52 includes a text "Yeah! Excellent food! I'm also going home by taxi". The IM 53 is transmitted from the terminal device 10A to the terminal device 10B. The IM 53 includes a text "By the way, this driver is very bad at driving!". The IMs 54, 55 are transmitted from the terminal device 10B to the terminal device 10A. The IM 54 includes a text "I am sorry for you". The IM 55 includes a text "My driver is good at driving. In addition, the interior of the taxi is very neat". As shown in FIG. 4, the IMs 56, 57 are transmitted from the terminal device 10A to the terminal device 10B. The IM 56 includes a text "My taxi has a neat interior, too!". The IM 57 includes a text "But I like a wider passenger seat".

The IMs 51 to 57 are transmitted and received during a period from a later-described scheduled pick-up time of the user A to a later-described scheduled drop-off time of the user A. The IM 52 is transmitted from the terminal device 10B, immediately after the vehicle 20 picks up the user B. The IM 57 is transmitted from the terminal device 10A, immediately after the vehicle 20B drops off the user B.

In FIGS. 3 and 4, instant messages transmitted and received between the terminal device 10A and the information processing device 30 serving as a vehicle allocation server are shown. An IM 50 as shown in FIG. 3 and IMs 58, 59, 60, 61 as shown in FIG. 4 are instant messages transmitted and received between the terminal device 10A and the information processing device 30 serving as a vehicle allocation server.

As shown in FIG. 3, the IM 50 is transmitted from the information processing device 30 serving as a vehicle allocation server to the terminal device 10A. The IM 50 includes a text "Taxi has been arranged. Pick-up place: AAA restaurant, Estimated time of Arrival: 22:00, Drop-off place: BBB apartment, Estimated time of arrival: 23:00". As shown in FIG. 4, the IMs 58, 59 are transmitted to the terminal device 10A from the information processing device 30 serving as a vehicle allocation server. The IM 58 includes a text "Vehicle allocation service has detected your request". The IM 59 includes a text "Do you request "wider passenger seat"?". The IM 60 is transmitted from the terminal device 10A to the information processing device 30 serving as a vehicle allocation server. The IM 60 includes a text "Yes". The IM 61 is transmitted from the information processing device 30 serving as a vehicle allocation server to the terminal device 10A. The IM 61 includes a text "Vehicle allocation service has received your request."

The instant messages transmitted and received between the terminal device 10A and the information processing device 30 serving as a vehicle allocation server, and the instant messages transmitted and received between the terminal device 10A and the terminal device 10B may be displayed on the same screen with a dividing line or the like interposed therebetween, or may be displayed on different screens. With such configuration, the user can easily distinguish between the instant messages transmitted and received between the terminal device 10A and the information processing device 30 serving as a vehicle allocation server, and the instant messages transmitted and received between the terminal device 10A and the terminal device 10B.

As shown in FIG. 2, the vehicle 20 includes a communication unit 21, an input unit 22, a storage unit 23, and a control unit 24.

The communication unit 21, like the communication unit 11, may be configured by including at least one communication module connectable with the network 40. The communication unit 21, like the communication unit 11, may be configured by further including a module that conforms to short-distance radio communications. The communication unit 21, like the communication unit 11, may be configured by further including a wireless communication module that conforms to non-contact telecommunications standards. The communication unit 21 may be configured by further including a global positioning system (GPS) receiving module.

The input unit 22 can receive an input from a user. The input unit 22, like the input unit 12, may be configured by including at least one input interface which can receive an input from a user as described before. The input unit 22 may be provided in the vehicle 20. The input unit 22 may be connected to the vehicle 20 as external input equipment, like the input unit 12.

The storage unit 23, like the storage unit 14, may be configured by including at least one semiconductor memory, at least one magnetic memory, and at least one optical memory, or at least a combination of two types of these memories. The storage unit 23 may function as a main storage, an auxiliary storage, or a cache memory. The storage unit 23 stores data used for operation of the vehicle 20, and data obtained by operation of the vehicle 20.

The control unit 24, like the control unit 15, may be configured by including at least one processor and at least one specialized circuit, or a combination of these. The control unit 24 can execute the processes related to the operation of the vehicle 20, while controlling each unit of the vehicle 20.

In the present embodiment, the vehicle 20 has a vehicle controller. The communication unit 21, the input unit 22, the storage unit 23, and the control unit 24 may constitute the vehicle controller. The functions of the vehicle controller are implemented by executing a vehicle control program according to the present embodiment by a processor included in the control unit 24. In short, the functions of the vehicle controller is implemented by software. The vehicle control program is a program for causing a computer to execute processes of the steps included in the operation of the vehicle controller, and thereby causes the computer to implement the functions corresponding to the processes of the steps. In short, the vehicle control program is a program for making the computer function as the vehicle controller.

Some or all of the functions of the vehicle controller of the vehicle 20 may be implemented by a specialized circuit included in the control unit 24. In short, some or all of the functions of the controller of the vehicle 20 may be implemented by hardware.

The control unit 24 can periodically acquire current location information on the vehicle 20 included in the information processing system 1 with the communication unit 21. The control unit 24 can transmit the acquired current location information on the vehicle 20 to the information processing device 30 through the network 40 with the communication unit 21.

The control unit 24 can transmit with the communication unit 21 a notification indicating that the user is picked up to the information processing device 30 through the network 40. When receiving an input indicating that the user is picked up with the input unit 22, the control unit 24 may transmit the notification indicating that the user is picked up to the information processing device 30. The input indicating that the user is picked up may be input through the input unit 22 by a driver of the vehicle 20. When the vehicle 20 picks up the user, the driver of the vehicle 20 can input the input indicating that the user is picked up through the input unit 22.

The control unit 24 can transmit a notification indicating that the user is dropped off to the information processing device 30 through the network 40 with the communication unit 21. When receiving an input indicating that the user is dropped off with the input unit 22, the control unit 24 may transmit a notification indicating that the user is dropped off to the information processing device 30. The input indicating that the user is dropped off may be input by the driver of the vehicle 20 from the input unit 22. When the vehicle 20 drops off the user, the driver of the vehicle 20 can input the input indicating that the user is dropped off through the input unit 22. When acquiring an identifier of the terminal device 10 with the communication unit 21, the control unit 24 may transmit a notification indicating that the user is dropped off to the information processing device 30. When the user places the communication unit 11 of the terminal device 10 over the communication unit 21, the control unit 24 can acquire the identifier of the terminal device 10 with the communication unit 21. When paying a boarding fare by electronic settlement, the user can place the communication unit 11 of the terminal device 10 over the communication unit 21.

As shown in FIG. 2, the information processing device 30 includes a communication unit 31, a storage unit 32, and a control unit 33.

The communication unit 31 may be configured by including at least one communication module connectable with the network 40. For example, the communication module is a module that conforms to communication standards, such as local area network (LAN) or wireless LAN communication standards.

The storage unit 32, like the storage unit 14, may be configured by including at least one semiconductor memory, at least one magnetic memory, and at least one optical memory, or at least a combination of two types of these memories. The storage unit 32 may function as a main storage, an auxiliary storage, or a cache memory. The storage unit 32 stores data used for operation of the information processing device 30, and data obtained by operation of the information processing device 30.

The control unit 33, like the control unit 15, may be configured by including at least one processor and at least one specialized circuit, or a combination of these. The control unit 33 can execute the processes related to the operation of the information processing device 30, while controlling each unit of the information processing device 30.

The functions of the information processing device 30 may be implemented by executing an information processing program according to the present embodiment by a processor corresponding to the information processing device 30. In other words, the functions of the information processing device 30 may be implemented by software. The information processing program can cause a computer to execute operation of the information processing device 30 and thereby cause the computer to function as the information processing device 30. In other words, the computer can function as the information processing device 30 by executing the operation of the information processing device 30 in accordance with the information processing program.

Some or all of the functions of the information processing device 30 may be implemented by a specialized circuit corresponding to the control unit 33. In short, some or all of the functions of the information processing device 30 may be implemented by hardware.

Vehicle Allocation Reservation Process

The control unit 33 can receive a vehicle allocation request notification, location information on a pick-up place, and location information on a drop-off place from the terminal device 10 through the network 40 with the communication unit 31. The control unit 33 executes a process to reserve vehicle allocation based on the vehicle allocation request notification received from the terminal device 10. For example, the control unit 33 can periodically receive current location information on the vehicles 20 included in the information processing system 1 from the vehicles 20 through the network 40 with the communication unit 31. The control unit 33 determines the vehicle 20 to be allocated, out of the vehicles 20 included in the information processing system 1, based on the received current location information on the vehicles 20 included in the information processing system 1 and the received location information on the pick-up place received from the terminal device 10 or the like. For example, the control unit 33 determines to allocate the vehicle 20A based on the vehicle allocation request notification received from the terminal device 10A, or the like. The control unit 33 also determines to allocate the vehicle 20B based on the vehicle allocation request notification received from the terminal device 10B.

In the vehicle allocation reservation process, the control unit 33 calculates estimated time of arrival at the pick-up place and estimated time of arrival at the drop-off place, based on the current location information on the vehicle 20 determined to be allocated, the location information on the pick-up place, the location information on the drop-off place, and current time. The control unit 33 stores the calculated estimated time of arrival at the pick-up place and the calculated estimated time of arrival at the drop-off place in the storage unit 32.

In the vehicle allocation reservation process, the control unit 33 may transmit a notification of vehicle allocation determination and information, such as the pick-up place, to the vehicle 20 that is determined to be allocated through the network 40 with the communication unit 31. As the notification of vehicle allocation determination and the information such as the pick-up place is transmitted, the driver of the vehicle 20 can recognize that the vehicle 20 driven by the driver is determined to be allocated, and also recognize the pick-up place and the like.

In the vehicle allocation reservation process, the control unit 33 generates an instant message including a text indicating arrangement of the vehicle 20 being completed, the pick-up place, the drop-off place, the estimated time of arrival at the pick-up place, and the estimated time of arrival at the drop-off place. For example, the control unit 33 generates the IM 50. The control unit 33 transmits the generated instant message to the terminal device 10 through the network 40 with the communication unit 31.

The control unit 33 can receive information for identifying at least one of actual pick-up time of the user and actual drop-off time of the user from the vehicle 20 through the network 40 with the communication unit 31.

For example, the control unit 33 can receive a notification indicating that the user is picked up as the information for identifying actual pick-up time of the user from the vehicle 20 through the network 40 with the communication unit 31. When the vehicle 20 picks up the user, the notification indicating that the user is picked up may be transmitted from the vehicle 20 to the information processing device 30. The time when the notification indicating that the user is picked up is transmitted may be regarded as the actual pick-up time of the user. The time when the notification indicating that the user is picked up is transmitted can be used to identify the actual pick-up time of the user.

For example, the control unit 33 can receive a notification indicating that the user is dropped off as information for identifying actual drop-off time of the user from the vehicle 20 through the network 40 with the communication unit 31. When the vehicle 20 drops off the user, the notification indicating that the user is dropped off may be transmitted from the vehicle 20 to the information processing device 30. The time when the notification indicating that the user is dropped off is transmitted may be regarded as the actual drop-off time of the user. The time when the notification indicating that the user is dropped off is transmitted can be used to identify the actual drop-off time of the user.

Message Transfer Process

The control unit 33 can receive instant messages and address information from the terminal device 10 through the network 40 with the communication unit 31. The control unit 33 executes an instant message transfer process based on the received instant messages and the address information. Hereinafter, the instant message transfer process is also stated as "IM transfer process". In the IM transfer process, the control unit 33 transmits with the communication unit 31 the received instant messages such that the received instant messages are transferred to the received addresses. In the present embodiment, the control unit 33 stores the received instant messages in the storage unit 32.

Message Selection Process

The control unit 33 selects at least one instant message as a selected message, from one or more instant messages transmitted and received between the terminal devices 10 including the first terminal device. The control unit 33 also selects the selected message based on at least one of the pick-up time and the drop-off time of the vehicle 20 picking up and dropping off the first user of the first terminal device. The first user is the user who is picked up by the vehicle 20. The first terminal device is the terminal device 10 possessed by the first user.

In the configuration shown in FIG. 1, the user A and the user B ride in the vehicle 20A and the vehicle 20B, respectively. Both the user A and the user B can be the first user. Both the terminal device 10A and the terminal device 10B can be the first terminal device. The selected message is used to determine evaluation of an in-vehicle service as described later. When the first user is the user A, evaluation of the service provided in the vehicle 20A is determined by the selected message selected based on the pick-up time of the vehicle 20A picking up the user A, or the like. When the first user is the user B, evaluation of the service provided in the vehicle 20B is determined by the selected message selected based on the pick-up time of the vehicle 20B picking up the user B, or the like. Here, when the first user operates the first terminal device while riding in the vehicle 20, instant messages can be transmitted from the first terminal device to another terminal device 10. There is a high possibility that the instant message, transmitted and received between the first terminal device and another terminal device 10 while the first user rides in the vehicle 20, includes topics relating to the in-vehicle service. The selected message selected based on at least one of the pick-up time and the drop-off time of the vehicle 20 picking up and dropping off the first user increases the possibility that the selected message includes topics relating to the in-vehicle service. Increasing the possibility that the selected message includes topics relating to the in-vehicle service makes it possible to determine evaluation of the in-vehicle service more accurately.

The pick-up time of the vehicle 20 picking up the first user may be one of scheduled pick-up time of the first user and actual pick-up time of the first user. When the scheduled pick-up time of the first user is adopted as the pick-up time of the vehicle 20 picking up the first user, the control unit 33 may acquire the estimated time of arrival at the pick-up place calculated in the vehicle allocation reservation process as the scheduled pick-up time of the first user. When the actual pick-up time of the first user is adopted as the pick-up time of the vehicle 20 picking up the first user, the control unit 33 may acquire actual pick-up time of the first user by receiving the information for identifying the actual pick-up time of the first user from the vehicle 20 as described above.

The drop-off time of the vehicle 20 dropping off the first user may be one of scheduled drop-off time of the first user and actual drop-off time of the first user. When the scheduled drop-off time of the first user is adopted as the drop-off time of the vehicle 20 dropping off the first user, the control unit 33 may acquire the estimated time of arrival at the drop-off place calculated in the vehicle allocation reservation process as the scheduled drop-off time of the first user. When the actual drop-off time of the first user is adopted as the drop-off time of the vehicle 20 dropping off the first user, the control unit 33 may acquire actual drop-off time of the first user by receiving the information for identifying the actual drop-off time of the first user from the vehicle 20 as described above.

The control unit 33 may select instant messages transmitted and received between the terminal devices 10 during a period from the pick-up time of the first user to the drop-off time of the first user as the selected message.

For example, the control unit 33 sets the user A as the first user, and selects the instant message transmitted and received between the terminal device 10A and the terminal device 10B during a period from the pick-up time of the user A to the drop-off time of the user A as the selected message. The scheduled pick-up time of the user A is adopted as the pick-up time of the user A, and the scheduled drop-off time of the user A is adopted as the drop-off time of the user A. In this case, the control unit 33 can select the IMs 51 to 57 as the selected message.

For example, the control unit 33 sets the user B as the first user, and selects the instant message transmitted and received between the terminal device 10A and the terminal device 10B during a period from the pick-up time of the user B to the drop-off time of the user B as the selected message. The actual pick-up time of the user B is adopted as the pick-up time of the user B, and the actual drop-off time of the user B is adopted as the drop-off time of the user B. In this case, the control unit 33 can select the IMs 52 to 56 as the selected message. As in the aforementioned example of the user A, the scheduled pick-up time of the user B may be adopted as the pick-up time of the user B, and the scheduled drop-off time of the user B may be adopted as the drop-off time of the user B.

The control unit 33 may select instant messages transmitted and received between the terminal devices 10 during a set period that is set based on the pick-up time of the first user as the selected message. When the scheduled pick-up time of the first user is adopted as the pick-up time of the first user, the set period may be a period from the time that is time T1 before the scheduled pick-up time of the first user to the time that is time T2 after the scheduled pick-up time of the first user. When the actual pick-up time of the first user is adopted as the pick-up time of the first user, the set period may be a period from the actual pick-up time of the first user to the time that is time T2 after the actual pick-up time of the first user. The time T1 may properly be set in consideration of the traffic of the roads around the pick-up place of the vehicle 20, or the like. The time T2 may properly be set in consideration of general time from the vehicle 20 picking up the user to the user transmitting user's impression immediately after the vehicle 20 picking up the user as an instant message with the terminal device 10. With such configuration, the instant message indicating the impression immediately after the vehicle 20 picks up the user can be selected as the selected message. Selecting the instant message indicating the impression of the user immediately after the vehicle 20 picks up the user as the selected message makes it possible to determine evaluation of the in-vehicle service more accurately in the later-described process.

The control unit 33 may select instant messages transmitted and received between the terminal devices 10 during a set period that is set based on the drop-off time of the first user as the selected message. When the scheduled drop-off time of the first user is adopted as the drop-off time of the first user, the set period may be a period from the time that is time T3 before the scheduled drop-off time of the first user to the time that is time T4 after the scheduled drop-off time of the first user. When the actual drop-off time of the first user is adopted as the drop-off time of the first user, the set period may be a period from the actual drop-off time of the first user to the time that is time T4 after the actual drop-off time of the first user. The time T3 may properly be set in consideration of the traffic of the roads around the drop-off place of the vehicle 20, or the like. The time T4 may properly be set in consideration of general time from the vehicle 20 dropping off the user to the user transmitting user's impression immediately after the vehicle 20 dropping off the user as an instant message with the terminal device 10. With such configuration, the instant message indicating the impression immediately after the vehicle 20 drops off the user can be selected as the selected message. Selecting the instant message indicating the impression of the user immediately after the vehicle 20 drops off the user as the selected message makes it possible to determine evaluation of the in-vehicle service more accurately in the later-described process.

The control unit 33 may select an instant message transmitted from the first terminal device as the selected message. The first user of the first terminal device is the user picked up by the vehicle 20 as described before. The instant message transmitted from the first terminal device has a high possibility of including the topics relating to the in-vehicle service. Selecting the instant message transmitted from the first terminal device as the selected message increases the possibility that the topics relating to the in-vehicle service are included in the selected message. Such configuration makes it possible to determine evaluation of the in-vehicle service more accurately in the later-described process.

For example, when the first terminal device is the terminal device 10A, the control unit 33 selects an instant message transmitted from the first terminal device as the selected message. The control unit 33 selects an instant message transmitted from the terminal device 10A during a period from the scheduled pick-up time of the user A as the pick-up time of the first user to the scheduled drop-off time of the user A as the drop-off time of the first user, as the selected message. In this case, the control unit 33 can select the IMs 51, 53, 56, 57 as the selected message.

For example, when the first terminal device is the terminal device 10B, the control unit 33 selects an instant message transmitted from the first terminal device as the selected message. The control unit 33 selects an instant message transmitted from the terminal device 10B during a period from the actual pick-up time of the user B as the pick-up time of the first user to the actual drop-off time of the user B as the drop-off time of the first user, as the selected message. In this case, the control unit 33 can select the IMs 52, 54, 55 as the selected message. As in the aforementioned example of the user A, the scheduled pick-up time of the user B may be adopted as the pick-up time of the user B, and the scheduled drop-off time of the user B may be adopted as the drop-off time of the user B.

Evaluation Determination Process

The control unit 33 determines evaluation of the in-vehicle service based on the selected message. The control unit 33 may determine the evaluation of the in-vehicle service by analyzing the selected message. When a text is included in the selected message, the control unit 33 may execute, as analysis of the selected message, natural language processing for the text included in the selected message. The control unit 33 may determine evaluation of the in-vehicle service by executing the natural language processing for the text included in the selected message. The evaluation of the in-vehicle service may include at least one of evaluation of the driver and evaluation of the cabin environment. Hereinafter, examples of the processing will be described.

First Example

The control unit 33 may estimate the content of a text relating to the in-vehicle service by executing the natural language processing for the text included in the selected message. When the estimated content of the text includes a phrase indicating preset favorable impression, the control unit 33 may determine a higher evaluation than when the estimated content includes a phrase indicating preset unfavorable impression. When the estimated content of the text includes the phrase indicating the preset unfavorable impression, the control unit 33 may determine a lower evaluation than when the estimated content includes the phrase indicating the preset favorable impression.

The phrase indicating the favorable impression may include phrases used with regard to driving of the driver, when the evaluation of the in-vehicle service includes evaluation of the driver. The phrase indicating the favorable impression may include phrases used with regard to the cabin environment, when the evaluation of the in-vehicle service includes evaluation of the cabin environment. For example, the phrase indicating the favorable impression includes phrases "very good" and "good" used regarding the driving of the driver, and phrases "neat" and "gorgeous" used regarding the cabin environment.

The phrase indicating the unfavorable impression may include phrases used with regard to driving of the driver, when evaluation of the in-vehicle service includes evaluation of the driver. The phrase indicating the unfavorable impression may include phrases used with regard to the cabin environment, when the evaluation of the in-vehicle service includes evaluation of the cabin environment. For example, the phrase indicating the unfavorable impression include phrases "very bad" and "bad" used regarding the driving of the driver, and phrases "dirty" and "shabby" used regarding the cabin environment.

FIG. 5 shows a first example of an evaluation result according to the first embodiment of the present disclosure. In FIG. 5, the evaluation of the in-vehicle service includes evaluation of the driver and evaluation of the cabin environment. In FIG. 5, evaluation is set as two-grade evaluation of high evaluation and low evaluation. The high evaluation is an evaluation higher than the low evaluation. In FIG. 5, the text of the selected message used for determination of evaluation is put in a selected message column. The phrase indicating the favorable impression or the phrase indicating the unfavorable impression which is used for determination of evaluation is put in a phrase column.

In FIG. 5, the control unit 33 determines evaluation of the driver of the vehicle 20A to be low evaluation, based on the text "By the way, this driver is very bad at driving!" and the phrase "very bad" which expresses an unfavorable impression. The control unit 33 determines evaluation of the cabin environment of the vehicle 20A to be high evaluation, based on the text "My taxi has a neat interior, too", and the phrase "neat" which expresses a favorable impression. The control unit 33 determines evaluation of the driver of the vehicle 20B to be high evaluation, based on the text "My driver is good at driving", and the phrase "good" which indicates a favorable impression. The control unit 33 determines evaluation of the cabin environment of the vehicle 20B to be high evaluation, based on the text "In addition, the interior of the taxi is very neat", and the phrase "neat" which expresses a favorable impression.

The control unit 33 may store as reference data the determined evaluation of the driver of the vehicle 20 in association with the identifier of the driver of the vehicle 20 in the storage unit 32. Storing the evaluation of the driver in association with the identifier of the driver allows evaluation for every driver.

The control unit 33 may store as reference data the selected message used for determination of the evaluation of the driver in association with the identifier of the driver in the storage unit 32. Storing the selected message in association with the identifier of the driver makes it possible to clarify points to be improved, points highly evaluated, and the like, for every driver.

The control unit 33 may store as reference data the determined evaluation of the cabin environment of the vehicle 20 in association with the identifier of the vehicle 20 in the storage unit 32. Storing the evaluation of the cabin environment of the vehicle 20 in association with the identifier of the vehicle 20 makes it possible to evaluate for every vehicle 20.

The control unit 33 may store as reference data the selected message used for determining evaluation of the cabin environment of the vehicle 20 in association with the identifier of the vehicle 20 in the storage unit 32. Storing the selected message in association with the identifier of the vehicle 20 makes it possible to clarify points to be improved, points highly evaluated, and the like, for every vehicle 20.

The control unit 33 may transmit at least one of the determined evaluation of the in-vehicle service and the selected message used for determining evaluation of the in-vehicle service to the first terminal device through the network 40 with the communication unit 31. In this case, in the terminal device 10 that is the first terminal device, the control unit 15 can receive at least one of the determined evaluation of the in-vehicle service and the selected message from the information processing device 30 through the network 40 with the communication unit 11. In the terminal device 10, the control unit 15 may output at least one of the received evaluation of the in-vehicle service and the received selected message to the output unit 13. In the terminal device 10, the control unit 15 may receive with the input unit 12 a user input with respect to at least one of the evaluation of the in-vehicle service and the selected message. In the terminal device 10, the control unit 15 may transmit the received user input to the information processing device 30 through the network 40 with the communication unit 11. The control unit 33 may receive the user input with respect to at least one of the evaluation of the in-vehicle service and the selected message from the terminal device 10 through the network 40 with the communication unit 31. The control unit 33 may correct at least one of the evaluation of the in-vehicle service and the selected message in accordance with the user input with respect to at least one of the received evaluation of the in-vehicle service and the received selected message, and may store the corrected evaluation or the corrected selected message, or may store the evaluation or the selected message without correction in the storage unit 32.

Second Example

The control unit 33 may execute evaluation of the in-vehicle service by imparting a score. Evaluation of the in-vehicle service may be higher as the score is higher. Specifically, when a text is included in the selected message, the control unit 33 may execute natural language processing for the text included in the selected message. By executing the natural language processing for the text included in the selected message, the control unit 33 estimates user's feelings toward the in-vehicle service, and classifies the estimated user's feelings into a preset feeling category. The natural language processing may use machine learning, such as deep learning. The feeling category may properly be set in consideration of the feelings that the users generally have toward the in-vehicle service. For example, there are five feeling categories including "very satisfied" "satisfied", "fair" "not satisfied" and "dislike".

When the evaluation of the in-vehicle service includes evaluation of the driver, the control unit 33 may estimate the user's feelings toward the driver, and may classify the estimated user's feelings into the preset feeling category. When the evaluation of the in-vehicle service includes evaluation of the cabin environment, the control unit 33 may estimate the user's feelings toward the cabin environment, and may classify the estimated user's feelings into the preset feeling category. The feeling category used for evaluation of the cabin environment may be the same as the feeling category used for evaluation of the driver, or may be different therefrom.

The control unit 33 may impart a score by collating the classified feeling category and reference information. The reference information may include association between the feeling categories and scores. For example, the feeling category "very satisfied" is associated with score "2" in the association. The feeling category "satisfied" is associated with score "1". The feeling category "fair" is associated with score "0". The feeling category "not satisfied" is associated with score "−1". The feeling category "dislike" is associated with score "−2".

FIG. 6 shows a second example of the evaluation result according to the first embodiment of the present disclosure. In FIG. 6, evaluation of the in-vehicle service includes evaluation of the driver and evaluation of the cabin environment. In FIG. 6, the text of the selected message used for determination of evaluation is in the selected message column.

In FIG. 6, the control unit 33 classifies the user's feelings estimated from the text "By the way, this driver is very bad at driving!" into the feeling category "dislike". The control unit 33 imparts score "−2" to the evaluation of the driver of the vehicle 20A by collating the feeling category "dislike" and the aforementioned association. The control unit 33 classifies the user's feelings estimated from the text "My taxi has a neat interior, too" into the feeling category "satisfied". The control unit 33 imparts score "1" to the evaluation of the cabin environment of the vehicle 20A by collating the feeling category "satisfied" and the aforementioned association. The control unit 33 classifies the user's feelings estimated from the text "My driver is good at driving" into the feeling category "satisfied". The control unit 33 imparts score "1" to the evaluation of the driver of the vehicle 20B by collating the feeling category "satisfied" and the aforementioned association. The control unit 33 classifies the user's feelings estimated from the text "In addition, the interior of the taxi is very neat" into the feeling category "very satisfied". The control unit 33 imparts score "2" to the evaluation of the cabin environment of the vehicle 20B by collating the feeling category "very satisfied" and the aforementioned association.

The reference information may include association between images used in the instant messages and the scores. When the selected message includes an image, the control unit 33 may impart a score by collating the image and the reference information. The images may include images used for determining evaluation of the driver, and images used for determining evaluation of the cabin environment. The images may be classified into the aforementioned feeling categories in advance. The information processing device 30 may provide the images to the terminal devices 10 for free or for profit.

As in the first example, the control unit 33 may store as reference data the determined evaluation of the driver of the vehicle 20 in association with the identifier of the driver of the vehicle 20 in the storage unit 32. As in the first example, the control unit 33 can store as reference data the selected message used for determination of the evaluation of the driver in association with the identifier of the driver in the storage unit 32. As in the first example, the control unit 33 may store as reference data the determined evaluation of the cabin environment of the vehicle 20 in association with the identifier of the vehicle 20 in the storage unit 32. As in the first example, the control unit 33 may store as reference data the selected message used for determining the evaluation of the cabin environment of the vehicle 20 in association with the identifier of the vehicle 20 in the storage unit 32.

As in the first example, the control unit 33 may transmit at least one of the determined evaluation of the in-vehicle service and the selected message used for determining evaluation of the in-vehicle service to the first terminal device through the network 40 with the communication unit 31. As in the first example, the control unit 33 may receive a user input with respect to at least one of the evaluation of the in-vehicle service and the selected message from the terminal device 10 through the network 40 with the communication unit 31. The control unit 33 may correct at least one of the evaluation of the in-vehicle service and the selected message in accordance with the user input with respect to at least one of the received evaluation of the in-vehicle service and the received selected message, and may store the corrected evaluation or the corrected selected message, or may store the evaluation or the selected message without correction in the storage unit 32.

User's Request Estimation Process

The control unit 33 may estimate a request of the first user based on the selected message. The control unit 33 may estimate the request of the first user by analyzing the selected message. When a text is included in the selected message, the control unit 33 may execute, as analysis of the selected message, natural language processing for the text included in the selected message. The control unit 33 may estimate the request of the first user by executing the natural language processing for the text included in the selected message. The selected message used for estimating the request of the first user may be an instant message transmitted from the first terminal device. When estimating the request of the first user, the control unit 33 may transmit the estimation result of the request of the first user to the first terminal device through the network 40 with the communication unit 31. Estimating the user's request makes it possible to improve the in-vehicle service more exactly.

For example, the IM 57 transmitted from the terminal device 10A as the first terminal device may be selected as the selected message. The control unit 33 estimates that the user A as the first user requests "wider passenger seat of the taxi" by executing the natural language processing for the text of the IM 57. The control unit 33 transmits the IM 59 to the terminal device 10A as the estimation result of the request of the user A.

The control unit 33 may transmit a preset message to the first terminal device through the network 40 with the communication unit 31, before transmitting the estimation result of the first user's request. The preset message may be the IM 58. With such configuration, the terminal device 10A can output the IM 58 prior to the IM 59 corresponding to the estimation result of the request of the user A. By viewing the IM 58 in advance before the IM 59, the user A is less likely to receive an impression of abruptness when the IM 59, which is an instant message from the vehicle allocation service, is output.

The control unit 33 can receive a user input with respect to the estimation result of the request of the first user from the first terminal device through the network 40 with the communication unit 31. For example, the control unit 33 receives the IM 60 with respect to the IM 59 corresponding to the estimation result of the request of the user A. The text "Yes" in the IM 60 corresponds to the input of the user A with respect to the IM 59. The control unit 33 may correct the estimation result of the request of the first user based on the user input received from the first terminal device, and may store the corrected estimation result in the storage unit 32, or may store the estimation result without correction in the storage unit 32 as the reference data.

When the received user input is an input which affirms the estimation result of the first user's request, the control unit 33 may store the estimation result of the first user's request without correction in the storage unit 32 as reference data. For example, the control unit 33 receives the IM 60 including the text "Yes". The text "Yes" in the IM 60 is an input which affirms the estimation result of the request of the user A. In this case, the control unit 33 stores the estimation result of the request of the user A for "wider passenger seat of the taxi" in the storage unit 32 without correction.

When the received user input is an input to correct the estimation result of the first user's request, the control unit 33 may correct the estimation result of the first user's request in response to the received user input, and may store the corrected estimation result in the storage unit 32.

After storing the estimation result of the first user's request, the control unit 33 may transmit a preset message to the first terminal device through the network 40 with the communication unit 31. The preset message may be the IM 61. The user A can know that the own request is received by viewing the IM 61 with the terminal device 10A.

Operation of Information Processing System

Figure 7:
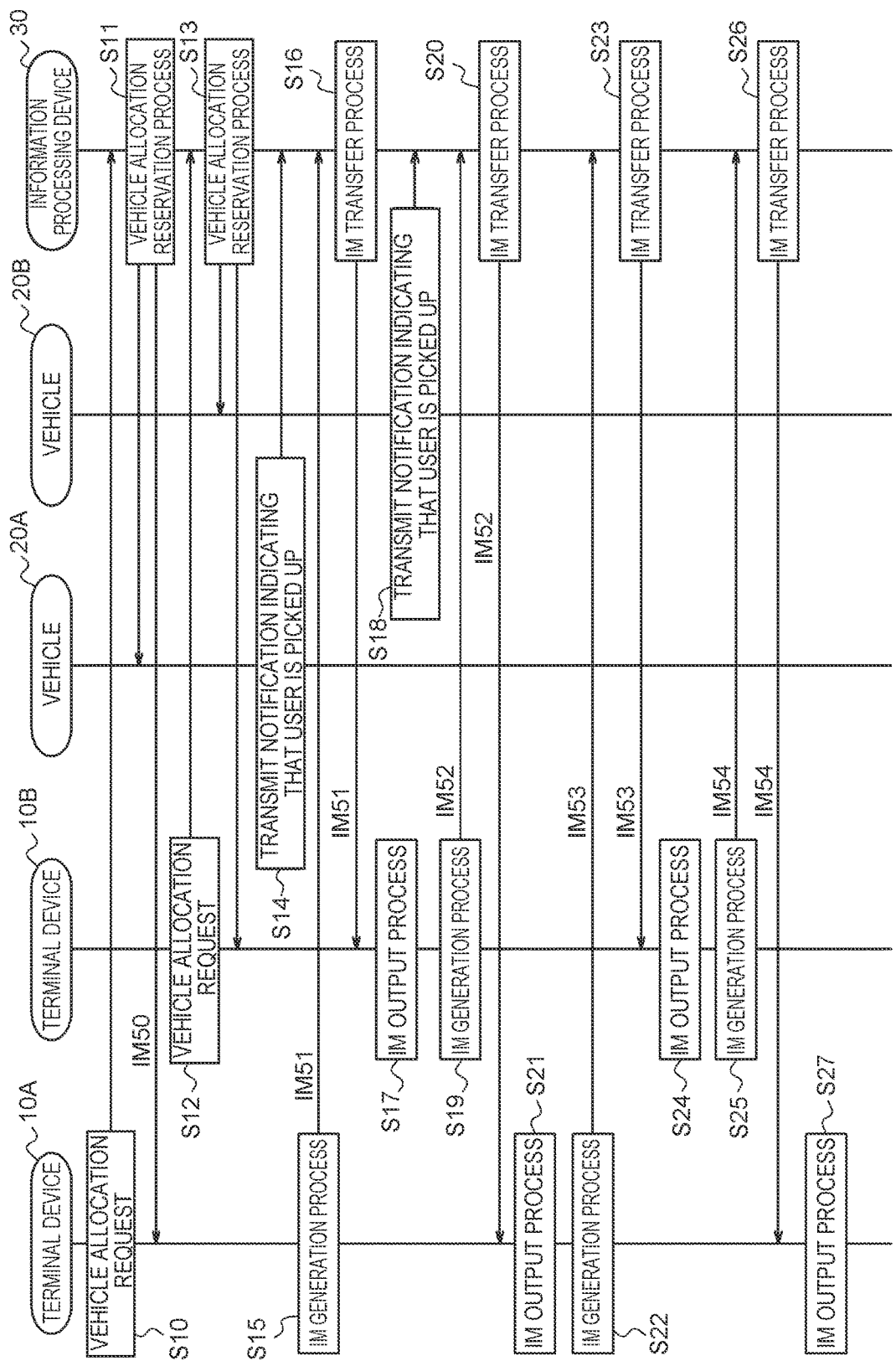
FIG. 7 is a sequence diagram showing an example of the operation of the information processing system shown in FIG. 1.
Figure 8:
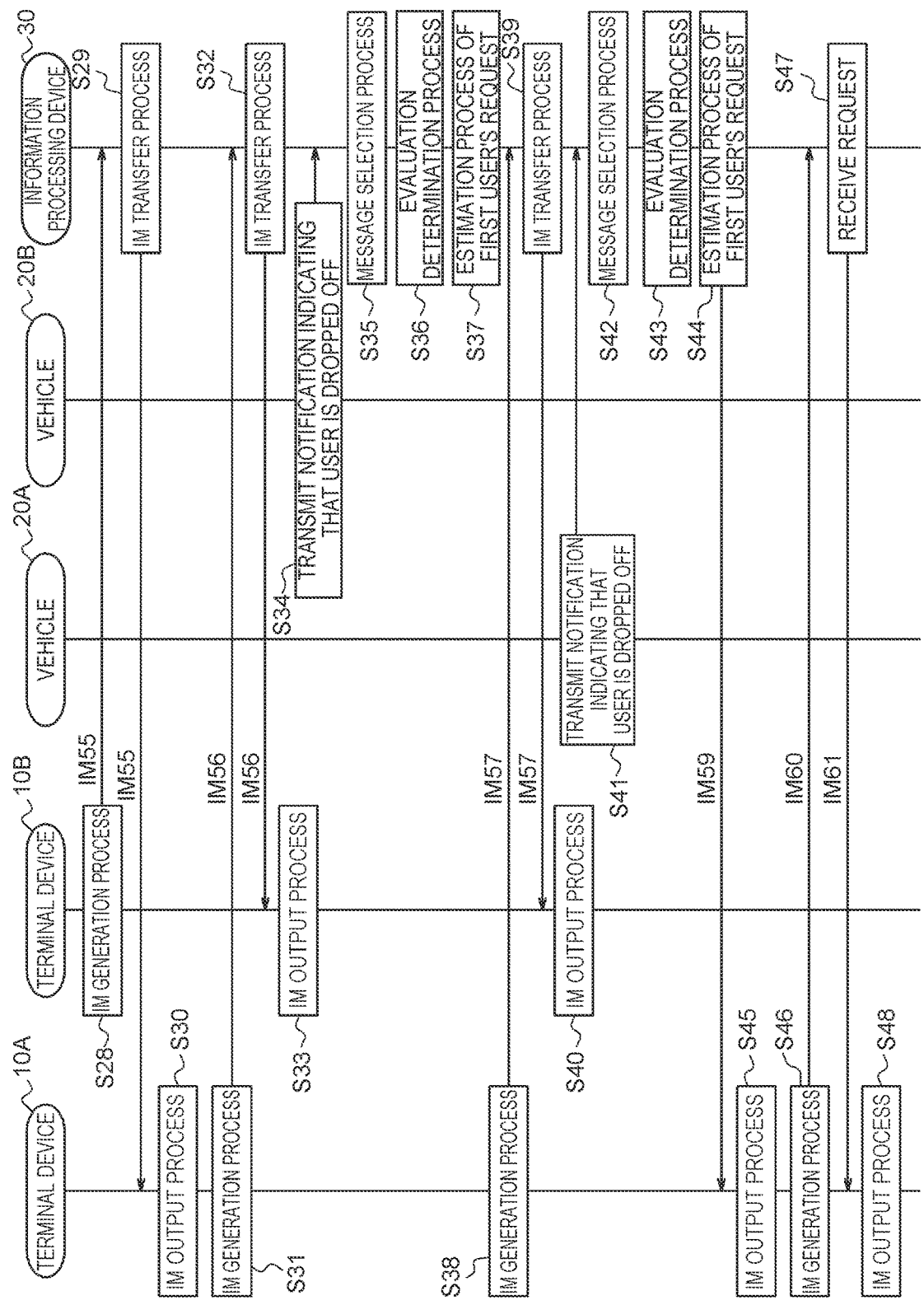
FIG. 8 is a sequence diagram showing an example of the operation of the information processing system shown in FIG. 1.

With reference to FIGS. 7 and 8, an example of the operation of the information processing system 1 shown in FIG. 1 will be described. The operation corresponds to an example of the evaluation method according to the present embodiment.

As shown in FIG. 7, the terminal device 10A executes a vehicle allocation request process (step S10). The information processing device 30 executes a vehicle allocation reservation process based on a vehicle allocation request notification received from the terminal device 10A (step S11). The terminal device 10B executes the vehicle allocation request process (step S12). The information processing device 30 executes the vehicle allocation reservation process based on the vehicle allocation request notification received from the terminal device 10B (step S13). The vehicle 20A transmits a notification indicating that the user is picked up to the information processing device 30 (step S14). The terminal device 10A executes an IM generation process (step S15), and transmits the IM 51 and address information on the terminal device 10B to the information processing device 30. The information processing device 30 executes an IM transfer process based on the received IM 51 and address information (step S16). The terminal device 10B executes an IM output process for the received IM 51 (step S17). The vehicle 20B transmits a notification indicating that the user is picked up to the information processing device 30 (step S18). The terminal device 10B executes the IM generation process (step S19), and transmits the IM 52 and address information on the terminal device 10A to the information processing device 30. The information processing device 30 executes the IM transfer process based on the received IM 52 and address information (step S20). The terminal device 10A executes the IM output process for the received IM 52 (step S21). The terminal device 10A executes the IM generation process (step S22), and transmits the IM 53 and address information on the terminal device 10B to the information processing device 30. The information processing device 30 executes the IM transfer process based on the received IM 53 and address information (step S23). The terminal device 10B executes the IM output process for the received IM 53 (step S24). The terminal device 10B executes the IM generation process (step S25), and transmits the IM 54 and the address information on the terminal device 10B to the information processing device 30. The information processing device 30 executes the IM transfer process based on the received IM 54 and address information (step S26). The terminal device 10A executes the IM output process for the received IM 54 (step S27).

As shown in FIG. 8, the terminal device 10B executes the IM generation process (step S28), and transmits the IM 55 and the address information on the terminal device 10A to the information processing device 30. The information processing device 30 executes the IM transfer process based on the received IM 55 and address information (step S29). The terminal device 10A executes the IM output process for the received IM 55 (step S30). The terminal device 10A executes the IM generation process (step S31), and transmits the IM 56 and the address information on the terminal device 10B to the information processing device 30. The information processing device 30 executes the IM transfer process based on the received IM 56 and address information (step S32). The terminal device 10B executes the IM output process for the received IM 56 (step S33). The vehicle 20B transmits a notification indicating that the user is dropped off to the information processing device 30 (step S34). The information processing device 30 sets the user B as the first user, and selects the selected message based on at least one of the pick-up time and drop-off time of the vehicle 20B picking up and dropping off the user B (step S35). The information processing device 30 determines evaluation of the service provided in the vehicle 20B based on the selected message (step S36). The information processing device 30 estimates a request of the user B as the first user based on the selected message (step S37). In the process of step S37, the information processing device 30 estimates that the request of the user B is not present. The terminal device 10A executes the IM generation process (step S38), and transmits the IM 57 and the address information on the terminal device 10B to the information processing device 30. The information processing device 30 executes the IM transfer process based on the received IM 57 and address information (step S39). The terminal device 10B executes the IM output process for the received IM 57 (step S40). The vehicle 20A transmits a notification indicating that the user is dropped off to the information processing device 30 (step S41). The information processing device 30 sets the user A as the first user, and selects the selected message based on at least one of the pick-up time and drop-off time of the vehicle 20A picking up and dropping off the user A (step S42). The information processing device 30 determines evaluation of the service provided in the vehicle 20A based on the selected message (step S43). The information processing device 30 estimates a request of the user A as the first user based on the selected message (step S44). In the process of step S44, the information processing device 30 transmits the IM 59 to the terminal device 10A. The terminal device 10A executes the IM output process for the received IM 59 (step S45). The terminal device 10A executes the IM generation process (step S46), and transmits the IM 60 and the address information on the vehicle allocation server to the information processing device 30. The information processing device 30 stores the estimation result of the request of the user A without correction in the storage unit 32 based on the received IM 60 (step S47). In the process of step S47, the information processing device 30 transmits the IM 61 to the terminal device 10A. The terminal device 10A executes the IM output process for the received IM 61 (step S48).

Thus, in the first embodiment, the information processing device 30 selects at least one instant message, from one or more instant messages transmitted and received between the terminal devices 10, as the selected message. The information processing device 30 selects the selected message based on at least one of the pick-up time and the drop-off time of the vehicle 20 picking up and dropping off the first user. The information processing device 30 determines evaluation of the service provided in the vehicle 20 based on the selected message that is selected. The selected message selected based on at least one of the pick-up time and the drop-off time of the vehicle 20 picking up and dropping off the first user increase the possibility that the selected message includes topics relating to the in-vehicle service. Therefore, according to the present embodiment, the information processing device 30 capable of evaluating the service provided in the vehicle 20 can be provided.

Second Embodiment

Figure 11:
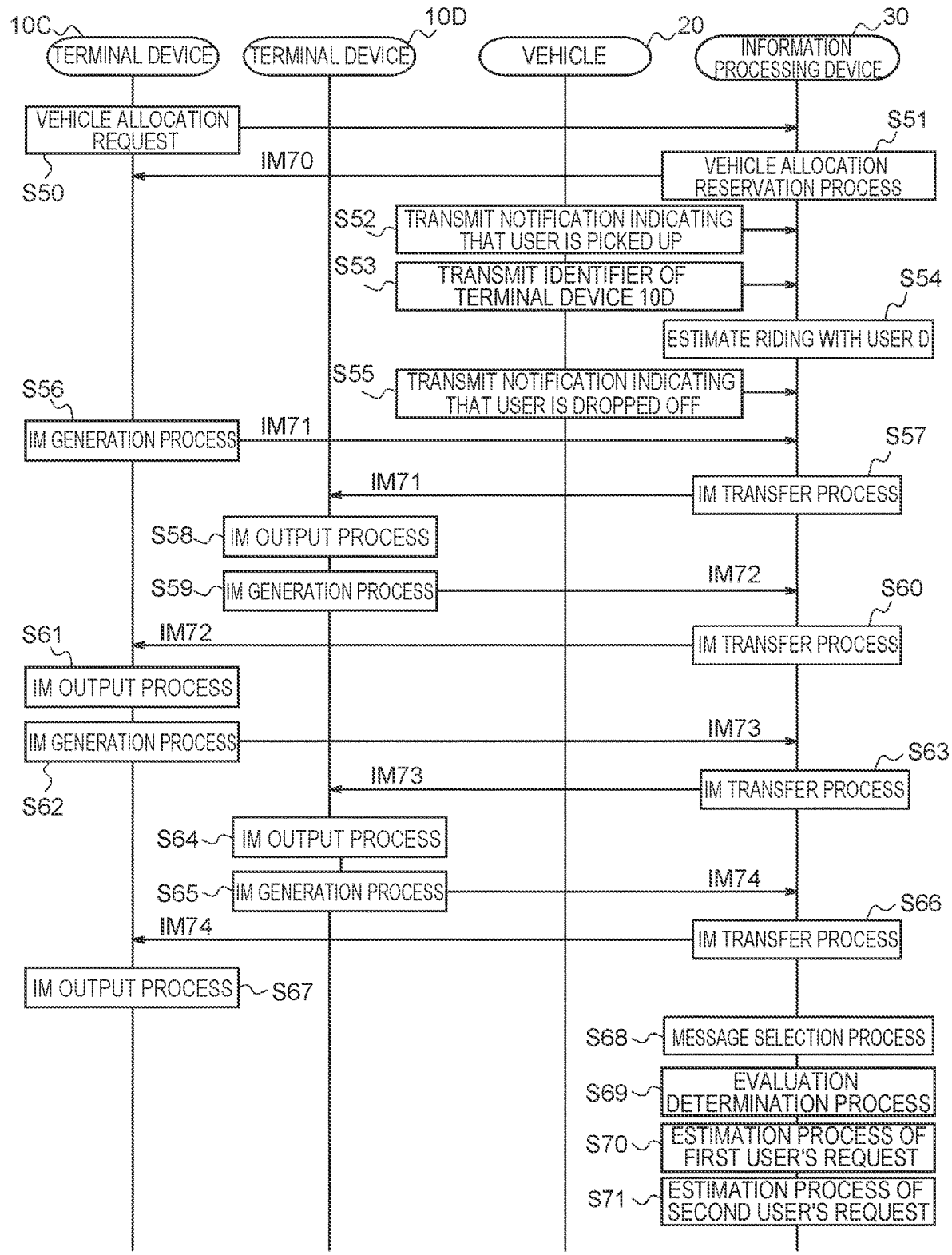
FIG. 11 is a sequence diagram showing an example of the operation of the information processing system shown in FIG. 9.

As shown in FIG. 11, an information processing system 101 according to a second embodiment of the present disclosure includes a terminal device 10C, a terminal device 10D, a vehicle 20, and an information processing device 30.

Hereinafter, the terminal device 10C and the terminal device 10D are also collectively stated as "terminal devices 10" unless otherwise distinguished from each other. The configuration of the terminal devices 10, the configuration of the vehicle 20, and the configuration of the information processing device 30 are each similar to the configuration as shown in FIG. 2. FIG. 11 shows the information processing system 101 including two terminal devices 10. The number of the terminal devices 10 included in the information processing system 101 is not limited to two. The information processing system 101 may include two or more terminal devices 10. For example, the number of the terminal devices 10 included in the information processing system 101 may be three or more.

Figure 10:
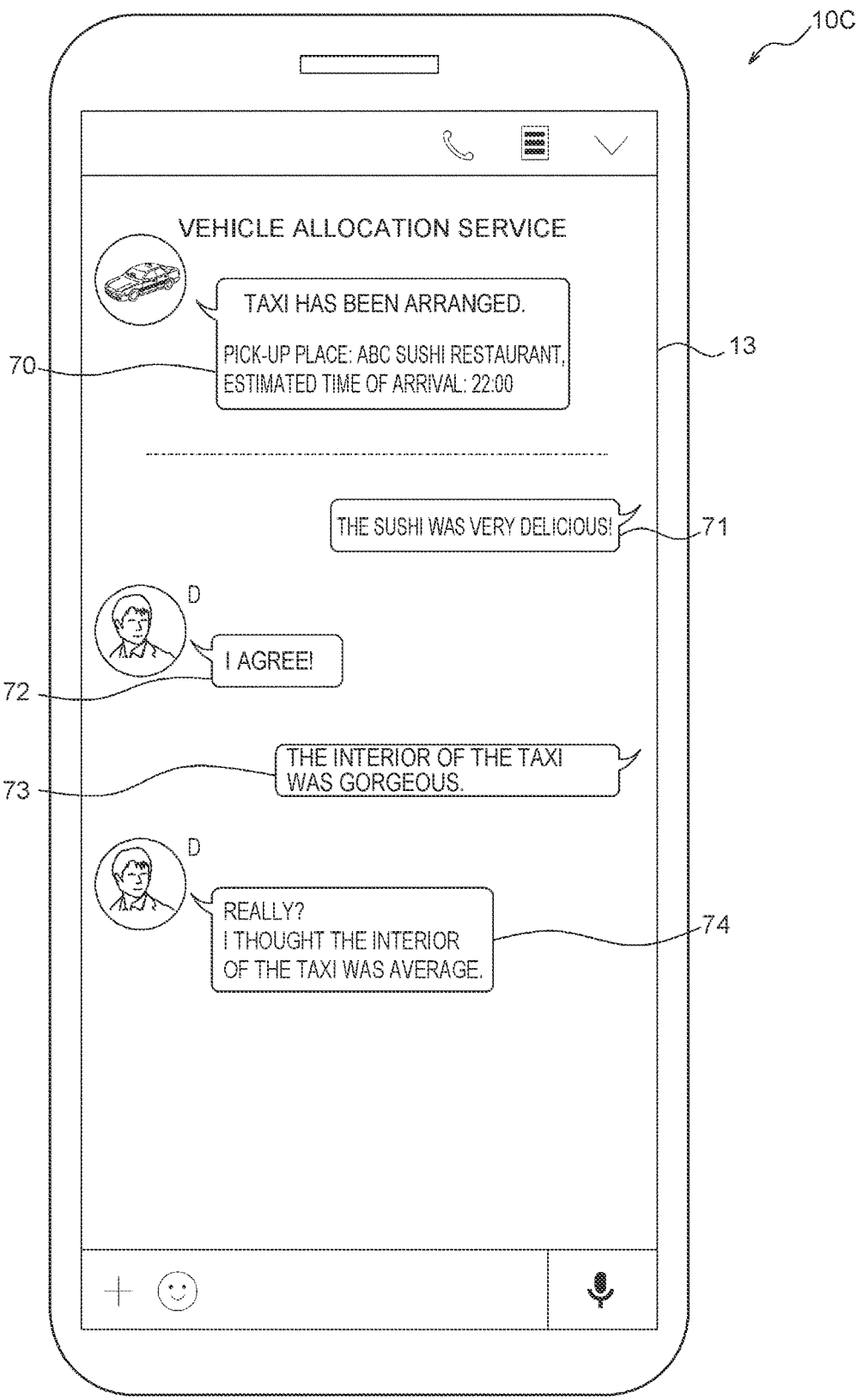
FIG. 10 shows an example of the screen of a terminal device shown in FIG. 9.

The terminal device 10C may be used by a user C. The terminal device 10D may be used by a user D. The user C operates the terminal device 10C to use the vehicle allocation service. In other words, the user C causes the terminal device 10C to execute the vehicle allocation request process. When the terminal device 10C executes the vehicle allocation request process, an IM 70 as shown later in FIG. 10 is transmitted from the information processing device 30 serving as a vehicle allocation server to the terminal device 10C.

The vehicle 20 is allocated when the terminal device 10C executes the vehicle allocation request process. The user C and the user D dine together in an ABC sushi restaurant. After dining in the ABC sushi restaurant, the user C and the user D go home by riding together in the vehicle 20. The vehicle 20 may drop off the user C and the user D separately.

In the vehicle 20, each time that the vehicle 20 drops off the user C and the user D, the control unit 24 may transmit a notification indicating that the user is dropped off to the information processing device 30 through the network 40 with the communication unit 21.

In the vehicle 20, the control unit 24 may transmit the identifiers of the terminal devices 10 to the information processing device 30 through the network 40. Here, the user C and the user D may pay a boarding fare by splitting or the like. In this case, when the vehicle 20 separately drops off the user C and the user D, the user C and the user D may place the communication units 11 of the terminal device 10C and the terminal device 10D over the communication unit 21 of the vehicle 20, respectively. When the users place the communication units 11 of the terminal devices 10 over the communication unit 21, the control unit 24 can acquire the identifiers of the terminal devices 10 with the communication unit 21.

The user C and the user D can make a direct conversation while riding together in the vehicle 20. After the vehicle 20 drops off the user C and the user D, the user C and the user D can operate the terminal device 10C and the terminal device 10D, respectively. After the vehicle 20 drops off the user C and the user D, instant messages as shown in FIG. 10 can be transmitted and received between the terminal device 10C and the terminal device 10D.

Figure 9:
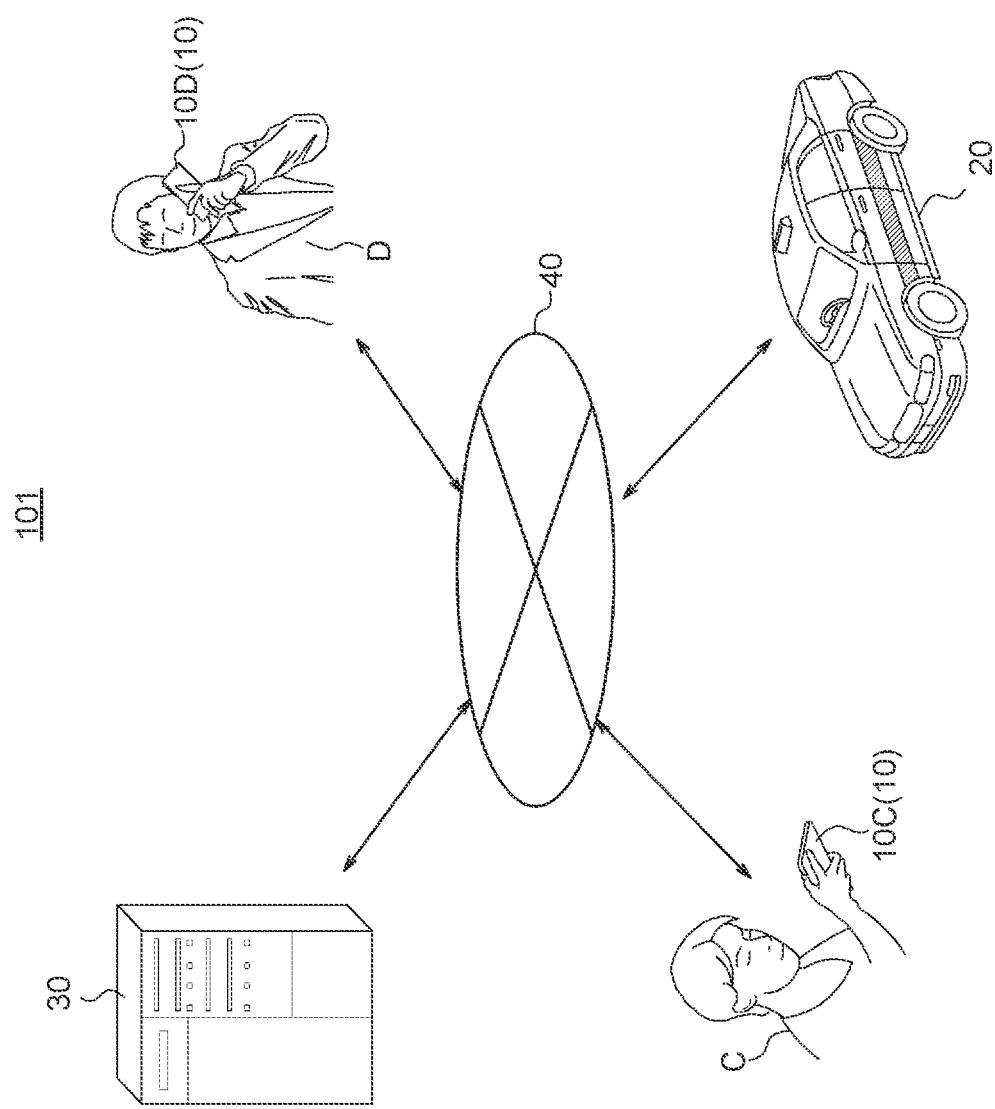
FIG. 9 shows configuration of an information processing system according to a second embodiment of the present disclosure.

FIG. 10 shows an example of the screen of the terminal device 10C shown in FIG. 9. In FIG. 10, the configuration of the output unit 13 is similar to the configuration of the output unit 13 as shown in FIG. 3. The IM 70 is an instant message transmitted from the information processing device 30 serving as a vehicle allocation server to the terminal device 10C as described above. The IM 70 includes a text "Taxi has been arranged. Pick-up place: ABC sushi restaurant, Estimated time of arrival: 22:00". IMs 71, 72, 73, 74 are instant messages transmitted and received between the terminal device 10C and the terminal device 10D. The IM 71 is transmitted from the terminal device 10C to the terminal device 10D. The IM 71 includes a text "The sushi was very delicious!". The IM 72 is transmitted from the terminal device 10D to the terminal device 10C. The IM 72 includes a text "I agree!". The IM 73 is transmitted from the terminal device 10C to the terminal device 10D. The IM 73 includes a text "The interior of the taxi was gorgeous.". The IM 74 is transmitted from the terminal device 10D to the terminal device 10C. The IM 74 includes a text "Really? I thought the interior of the taxi was average".

Estimation Process of Second User

In the information processing device 30, the control unit 33 can estimate that the first user of the first terminal device and the second user of the second terminal device rode together. For example, the first terminal device is the terminal device 10C which executes the vehicle allocation request process. The first user is the user C. The second user is the user D who rode with the user C in the vehicle 20. The second terminal device is the terminal device 10D.

When receiving the identifier of the terminal device 10 different from the first terminal device from the vehicle 20 through the network 40 with the communication unit 31, the control unit 33 may estimate that the first user and the second user rode together in the vehicle 20. For example, when receiving the identifier of the terminal device 10D, the control unit 33 estimates that the user C as the first user and the user D as the second user rode together in the vehicle 20.

The control unit 33 may estimate that the first user and the second user rode together in the vehicle 20 by executing natural language processing for the texts in the instant messages transmitted and received between the first terminal device and the terminal device 10 different from the first terminal device. The control unit 33 may estimate whether the contents of these instant messages are about the topics relating to the same vehicle 20 by executing natural language processing of the texts in these instant messages. When estimating that the contents of these instant messages are about the topics relating to the same vehicle 20, the control unit 33 may estimate that the first user and the user of the terminal device 10 different from the first terminal device, i.e., the second user, rode together in the vehicle 20. For example, the control unit 33 can estimate that the contents of the IMs 73, 74 are about the topics relating to the same vehicle 20 by executing the natural language processing of the texts included in the IMs 71 to 74. The control unit 33 can estimate that the user C as the first user and the user D as the second user rode together in the vehicle 20.

Message Selection Process

When estimating that the first user and the second user rode together in the vehicle 20, the control unit 33 selects the selected message from one or more instant messages transmitted and received between the first terminal device and the second terminal device. When the first user and the second user ride together in the vehicle 20, the possibility that the instant messages transmitted and received between the first terminal device and the second terminal device include the topics relating to the same vehicle can increase. Selecting the selected message from the instant messages transmitted and received between the first terminal device and the second terminal device can increase the possibility that the selected message includes the topics relating to the vehicle 20.

The control unit 33 may select one or more instant messages transmitted and received between the first terminal device and the second terminal device during a set period that is set based on the drop-off time of the first user as the selected message. The drop-off time of the first user may be one of scheduled drop-off time of the first user and actual drop-off time of the first user. When the scheduled pick-up time of the first user is adopted as the pick-up time of the first user, the set period may be a period from the time that is time T3 before the scheduled pick-up time of the first user to the time that is time T5 after the scheduled pick-up time of the first user. When the actual pick-up time of the first user is adopted as the pick-up time of the first user, the set period may be a period from the actual pick-up time of the first user to the time that is time T5 after the actual pick-up time of the first user. The time T5 may properly be set in consideration of the time when the instant messages about one topic are transmitted and received between the terminal devices 10. Here, the first user and the second user can make a direct conversation while riding together in the vehicle 20. After the vehicle 20 drops off the first user and the second user, instant messages can be transmitted and received between the first terminal device and the second terminal device. The instant messages transmitted and received between the first terminal device and the second terminal device after the vehicle 20 drops off the first user and the second user have a high possibility of including the topics relating to the vehicle 20. Setting the set period based on the drop-off time of the first user can increase the possibility that the selected message includes the topics relating to the vehicle 20.

The control unit 33 may select the instant message transmitted and received between the first terminal device and the second terminal device during a set period set based on the drop-off time of one of the first user and the second user, who is dropped off first, as the selected message. The set period may be a period from the drop-off time of the user who is dropped off first to the time that is time T5 after the drop-off time of the user who is dropped off first. As described above, the control unit 33 can receive the notifications indicating that the users are dropped off, the identifiers of the terminal devices 10, and the like, from the vehicle 20. In this case, the control unit 33 may regard the earliest time, among the transmission time of the notifications indicating that the users are dropped off and the transmission time of the identifiers of the terminal devices 10, as the drop-off time of the user who is dropped off first. For example, the user who is dropped off first is the user C. The IMs 71 to 74 are transmitted and received during the period from the drop-off time of the user C to the time that is time T5 after the pick-up time of the user C. In this case, the control unit 33 selects the IMs 71 to 74 as the selected message.

As in the first embodiment, the control unit 33 determines evaluation of the in-vehicle service based on the selected message. As in the first embodiment, the control unit 33 may estimate at least one of the request of the first user and the request of the second user based on the selected message. The selected message used for estimating the request of the first user may be an instant message transmitted from the first terminal device. The selected message used for estimating the request of the second user may be an instant message transmitted from the second terminal device.

Operation of Information Processing System

An example of the operation of the information processing system 101 shown in FIG. 9 will be described with reference to FIG. 11. The operation corresponds to an example of an evaluation method according to the present embodiment.

The terminal device 10C executes the vehicle allocation request process (step S50). The information processing device 30 executes the vehicle allocation reservation process based on a vehicle allocation request notification received from the terminal device 10C (step S51). The vehicle 20 transmits a notification indicating that the user is picked up to the information processing device 30 (step S52). The vehicle 20 transmits the identifier of the terminal device 10D to the information processing device 30 (step S53). The information processing device 30 estimates that the user C of the terminal device 10C and the user of the terminal device 10D rode together in the vehicle 20 by receiving the identifier of the terminal device 10D (step S54). The vehicle 20 transmits a notification indicating that the users are dropped off to the information processing device 30 (step S55). The terminal device 10C executes the IM generation process (step S56), and transmits the IM 71 and address information on the terminal device 10D to the information processing device 30. The information processing device 30 executes the IM transfer process based on the received IM 71 and address information (step S57). The terminal device 10D executes the IM output process for the received IM 71 (step S58). The terminal device 10D executes the IM generation process (step S59), and transmits the IM 72 and address information on the terminal device 10C to the information processing device 30. The information processing device 30 executes the IM transfer process based on the received IM 72 and address information (step S60). The terminal device 10C executes the IM output process for the received IM 72 (step S61). The terminal device 10C executes the IM generation process (step S62), and transmits the IM 73 and the address information on the terminal device 10D to the information processing device 30. The information processing device 30 executes the IM transfer process based on the received IM 73 and address information (step S63). The terminal device 10D executes the IM output process for the received IM 73 (step S64). The terminal device 10D executes the IM generation process (step S65), and transmits the IM 74 and the address information on the terminal device 10C to the information processing device 30. The information processing device 30 executes the IM transfer process based on the received IM 74 and address information (step S66). The terminal device 10C executes the IM output process for the received IM 74 (step S67). The information processing device 30 selects the selected message from the instant messages transmitted and received between the terminal device 10C as the first terminal device and the terminal device 10D as the second terminal device (step S68). The information processing device 30 determines evaluation of the in-vehicle service based on the selected message (step S69). The information processing device 30 estimates the request of the user C as the first user based on the selected message (step S70). The information processing device 30 estimates the request of the user D as the second user based on the selected message (step S71).

Thus, in the second embodiment, when estimating that the first user and the second user rode together in the vehicle 20, the information processing device 30 selects the selected message from one or more instant messages transmitted and received between the first terminal device and the second terminal device. As described above, selecting the selected message from the instant messages transmitted and received between the first terminal device and the second terminal device can increase the possibility that the selected message includes the topics relating to the vehicle 20. With such configuration, the information processing device 30 can determine evaluation of the in-vehicle service more correctly.

Other configurational aspects and effects of the information processing system 101 according to the second embodiment are similar to the information processing system 1 according to the first embodiment.

The present disclosure is not limited to the embodiments disclosed. For example, a plurality of blocks described in the block diagrams may be combined, or one block may be divided. Instead of chronologically executing a plurality of steps stated in the flowcharts in accordance with the description, the steps may be executed in parallel or in different order in accordance with the performance of the devices that execute the respective steps or in accordance with the need. Furthermore, modifications are possible without departing from the scope of the present disclosure.

For example, in the second embodiment, the second user is described as one of the users D. However, the number of the second users may be two or more when two or more users ride in the vehicle 20 with the first user, for example.

What is claimed is:

1. An information processing device, comprising:
a communication unit; and
a control unit configured to
    select at least one instant message as a selected message from one or more instant messages transmitted and received between a plurality of terminal devices including a first terminal device, based on at least one of pick-up time and drop-off time of a vehicle picking up and dropping off a first user of the first terminal device, and
    determine evaluation of an in-vehicle service provided in the vehicle by executing a natural language processing for a text included in the selected message,
wherein the control unit is configured to calculate scheduled pick-up time of the first user as the pick-up time of the first user and scheduled drop-off time of the first user as the drop-off time of the first user, based on current location information on the vehicle, location information on a pick-up place and a drop-off place received with the communication unit from the first terminal device, and current time.

2. The information processing device according to claim 1, wherein the control unit is configured to select an instant message transmitted and received between the terminal devices during a period from the pick-up time of the first user to the drop-off time of the first user as the selected message.

3. The information processing device according to claim 1, wherein the control unit is configured to select an instant message transmitted and received between the terminal devices during a period set based on the pick-up time of the first user as the selected message.

4. The information processing device according to claim 1, wherein the control unit is configured to select an instant message transmitted and received between the terminal devices during a period set based on the drop-off time of the first user as the selected message.

5. The information processing device according to claim 1, wherein the control unit is configured to receive information for identifying at least one of actual pick-up time of the first user as the pick-up time of the first user and actual drop-off time of the first user as the drop-off time of the first user from the vehicle with the communication unit.

6. The information processing device according to claim 1, wherein the control unit is configured to select at least one instant message transmitted from the first terminal device as the selected message.

7. The information processing device according to claim 1, wherein when the selected message includes a text, the control unit is configured to execute natural language processing for the text to determine evaluation of the service.

8. The information processing device according to claim 7, wherein the control unit is configured to execute evaluation of the service by imparting a score such that the evaluation is higher as the score is higher, the score being imparted by
    estimating user's feelings toward the service by the natural language processing, classifying the estimated user's feelings into a preset feeling category, and
    collating the classified feeling category with reference information including association between the feeling category and the score.

9. The information processing device according to claim 8, wherein:
    the reference information further includes association between images used in the instant messages and the score; and
    when the selected message includes an image, the control unit collates the image and the reference information to impart the score.

10. The information processing device according to claim 1, wherein the evaluation includes at least one of evaluation of a driver of the vehicle and evaluation of a cabin environment of the vehicle.

11. The information processing device according to claim 1, wherein the control unit is configured to
    determine the evaluation of the driver of the vehicle based on the selected message, and
    store the determined evaluation of the driver of the vehicle in association with an identifier of the driver of the vehicle as reference data.

12. The information processing device according to claim 1, wherein the control unit is configured to estimate a request of the first user based on the selected message.

13. The information processing device according to claim 12, wherein when estimating the request of the first user, the control unit is configured to transmit an estimation result to the first terminal device with the communication unit, and correct and store the estimation result, or store the estimation result without correction as reference data, based on a user input received from the first terminal device with the communication unit.

14. The information processing device according to claim 1, wherein the control unit is configured to execute a vehicle allocation reservation process based on a vehicle allocation request notification received from the first terminal device with the communication unit.

15. The information processing device according to claim 1, wherein:

the terminal devices include a second terminal device different from the first terminal device; and when estimating that the first user of the first terminal device and a second user of the second terminal device rode together in the vehicle, the control unit is configured to select the selected message from the one or more instant messages transmitted and received between the first terminal device and the second terminal device.

16. The information processing device according to claim 15, wherein when receiving an identifier of the second terminal device from the vehicle with the communication unit, the control unit is configured to estimate that the first user and the second user rode together in the vehicle.

17. The information processing device according to claim 15, wherein when estimating that the first user and the second user rode together in the vehicle, the control unit is configured to select an instant message transmitted and received between the first terminal device and the second terminal device during a period set based on the drop-off time of one of the first user and the second user who is dropped off first, as the selected message.

18. A non-transitory storage medium storing instructions that are executable by one or more processors and that cause the one or more processors to perform functions comprising:

selecting at least one instant message as a selected message from one or more instant messages transmitted and received between a plurality of terminal devices including a first terminal device, based on at least one of pick-up time and drop-off time of a vehicle picking up and dropping off a first user of the first terminal device; and determining evaluation of an in-vehicle service provided in the vehicle by executing a natural language processing for a text included in the selected message, wherein scheduled pick-up time of the first user is calculated as the pick-up time of the first user and scheduled drop-off time of the first user is calculated as the drop-off time of the first user, based on current location information on the vehicle, location information on a pick-up place and a drop-off place received from the first terminal device, and current time.

19. An evaluation method, comprising:

transmitting and receiving one or more instant messages between a plurality of terminal devices including a first terminal device;

selecting by an information processing device at least one instant message as a selected message from the one or more instant messages transmitted and received between the terminal devices, based on at least one of pick-up time and drop-off time of a vehicle picking up and dropping off a first user of the first terminal device; and determining evaluation of an in-vehicle service provided in the vehicle by executing a natural language processing for a text included in the selected message by the information processing device, wherein scheduled pick-up time of the first user is calculated as the pick-up time of the first user and scheduled drop-off time of the first user is calculated as the drop-off time of the first user, based on current location information on the vehicle, location information on a pick-up place and a drop-off place received from the first terminal device, and current time.

\* \* \* \* \*